(12) United States Patent
Wu et al.

(10) Patent No.: US 10,670,833 B2
(45) Date of Patent: Jun. 2, 2020

(54) IMAGING LENS ASSEMBLY, IMAGING APPARATUS AND ELECTRONIC DEVICE

(71) Applicant: LARGAN PRECISION CO., LTD., Taichung (TW)

(72) Inventors: Chien-Hsun Wu, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 138 days.

(21) Appl. No.: 15/857,924

(22) Filed: Dec. 29, 2017

(65) Prior Publication Data
US 2018/0321467 A1 Nov. 8, 2018

(30) Foreign Application Priority Data
May 8, 2017 (TW) .............................. 106115167 A

(51) Int. Cl.
| | |
|---|---|
| G02B 9/62 | (2006.01) |
| G02B 13/18 | (2006.01) |
| G02B 27/00 | (2006.01) |
| G02B 13/00 | (2006.01) |
| G02B 13/04 | (2006.01) |
| G02B 13/22 | (2006.01) |

(52) U.S. Cl.
CPC ............ G02B 9/62 (2013.01); G02B 13/0045 (2013.01); G02B 13/04 (2013.01); G02B 13/18 (2013.01); G02B 13/22 (2013.01); G02B 27/0025 (2013.01)

(58) Field of Classification Search
CPC ...... G02B 13/0045; G02B 9/62; G02B 13/18; G02B 27/0025; G02B 3/04; G02B 5/005; G02B 5/208; G02B 13/0015; G02B 13/04; G02B 13/002; G02B 13/06; G02B 1/041; G02B 13/003; G02B 13/16; G02B 13/22; G02B 27/646; G02B 9/10; G02B 9/60; G02B 13/006; G02B 9/04; G02B 13/0005; G02B 13/004; G02B 13/14; G02B 1/04; G02B 27/0031; G02B 3/00; G02B 3/02; G02B 7/028; G02B 9/64; H04N 5/2254; H04N 5/335; H04N 5/372; H04N 5/374; H04N 9/09; H04N 1/028; H04N 1/02895; H04N 5/2252
USPC ..................................................... 359/713
See application file for complete search history.

(56) References Cited

U.S. PATENT DOCUMENTS

| | | | |
|---|---|---|---|
| 2,933,018 | A | 4/1960 | Sandback |
| 4,986,642 | A | 1/1991 | Yokota et al. |
| 6,028,717 | A | 2/2000 | Kohno et al. |
| 9,703,089 | B2 | 7/2017 | Harada et al. |

(Continued)

FOREIGN PATENT DOCUMENTS

| | | |
|---|---|---|
| JP | 56140311 A | 11/1981 |
| JP | 04335609 A | 11/1992 |

(Continued)

*Primary Examiner* — Collin X Beatty
*Assistant Examiner* — Grant A Gagnon
(74) *Attorney, Agent, or Firm* — McClure, Qualey & Rodack, LLP

(57) ABSTRACT

An imaging lens assembly includes six lens elements, the six lens elements being, in order from an object side to an image side, a first lens element, a second lens element, a third lens element, a fourth lens element, a fifth lens element and a sixth lens element. The first lens element has negative refractive power. The second lens element has positive refractive power. The fifth lens element has positive refractive power.

31 Claims, 22 Drawing Sheets

(56) References Cited

U.S. PATENT DOCUMENTS

| | | |
|---|---|---|
| 2012/0224268 A1 | 9/2012 | Takato |
| 2014/0015999 A1 | 1/2014 | Miyano |
| 2015/0177493 A1 | 6/2015 | Asami |
| 2018/0074290 A1 | 3/2018 | Chang et al. |
| 2018/0074291 A1 | 3/2018 | Chang et al. |

FOREIGN PATENT DOCUMENTS

| | | |
|---|---|---|
| JP | 09010170 A | 1/1997 |
| JP | 2004341376 A | 12/2004 |
| JP | 2008116794 A | 5/2008 |
| JP | 2016114870 A | 6/2016 |
| TW | I616677 B | 3/2018 |

IMAGING LENS ASSEMBLY, IMAGING APPARATUS AND ELECTRONIC DEVICE

RELATED APPLICATIONS

This application claims priority to Taiwan Application Serial Number 106115167, filed May 8, 2017, which is herein incorporated by reference.

BACKGROUND

Technical Field

The present disclosure relates to an imaging lens assembly and an imaging apparatus. More particularly, the present disclosure relates to an imaging lens assembly and an imaging apparatus with wide field of view applicable to electronic devices.

Description of Related Art

In response to various market demands, specifications of photographing modules have become strict. It is difficult for reducing the size of products with conventional lens assemblies due to the limited shape of lens elements and variation of material thereof, and it is also hard to obtain balance among molding of lens elements, convenience of assembling and sensitivity thereof. Moreover, under different environmental conditions, to maintain normal operation of lens assemblies and good image quality is an indispensable factor of current photographing modules. Hence, one lens assembly which has sufficient field of view, compactness, anti-environmental change and high image quality will fully satisfy market specifications and demands.

SUMMARY

According to one aspect of the present disclosure, an imaging lens assembly includes six lens elements, which are, in order from an object side to an image side, a first lens element, a second lens element, a third lens element, a fourth lens element, a fifth lens element and a sixth lens element. The first lens element has negative refractive power. The second lens element has positive refractive power. The third lens element has negative refractive power. The fifth lens element has positive refractive power. When a focal length of the fifth lens element is f5, a central thickness of the second lens element is CT2, a curvature radius of an image-side surface of the second lens element is R4, and a curvature radius of an object-side surface of the third lens element is R5, the following conditions are satisfied:

0.10<$f5/CT2$<1.20; and ($R4+R5$)/($R4-R5$)<0.75.

According to another aspect of the present disclosure, an imaging lens assembly includes six lens elements, which are, in order from an object side to an image side, a first lens element, a second lens element, a third lens element, a fourth lens element, a fifth lens element and a sixth lens element. The first lens element has negative refractive power. The second lens element has positive refractive power. The fifth lens element has positive refractive power. The sixth lens element has an image-side surface being convex in a paraxial region thereof. When a focal length of the fifth lens element is f5, a central thickness of the second lens element is CT2, a curvature radius of an object-side surface of the third lens element is R5, a curvature radius of an image-side surface of the third lens element is R6, a curvature radius of an object-side surface of the fourth lens element is R7, and a curvature radius of an image-side surface of the fourth lens element is R8, the following conditions are satisfied:

0.10<$f5/CT2$<1.40;

0.45<($R5+R6$)/($R5-R6$); and ($R7+R8$)/($R7-R8$)<1.50.

According to another aspect of the present disclosure, an imaging apparatus includes the imaging lens assembly of the aforementioned aspect and an image sensor, wherein the image sensor is disposed on an image surface of the imaging lens assembly.

According to another aspect of the present disclosure, an electronic device includes the imaging apparatus of the aforementioned aspect.

According to still another aspect of the present disclosure, an imaging lens assembly includes six lens elements, which are, in order from an object side to an image side, a first lens element, a second lens element, a third lens element, a fourth lens element, a fifth lens element and a sixth lens element. The first lens element has negative refractive power. The second lens element has positive refractive power. The third lens element has negative refractive power. The fifth lens element has positive refractive power. When a curvature radius of an object-side surface of the third lens element is R5, a curvature radius of an image-side surface of the third lens element is R6, a focal length of the fifth lens element is f5, a central thickness of the second lens element is CT2, and an axial distance between the first lens element and the second lens element is T12, the following conditions are satisfied:

−3.50<($R5+R6$)/($R5-R6$); and 0.50<$f5/CT2+f5/T12$<2.50.

BRIEF DESCRIPTION OF THE DRAWINGS

The present disclosure can be more fully understood by reading the following detailed description of the embodiments, with reference made to the accompanying drawings as follows.

DETAILED DESCRIPTION

Figure 1:
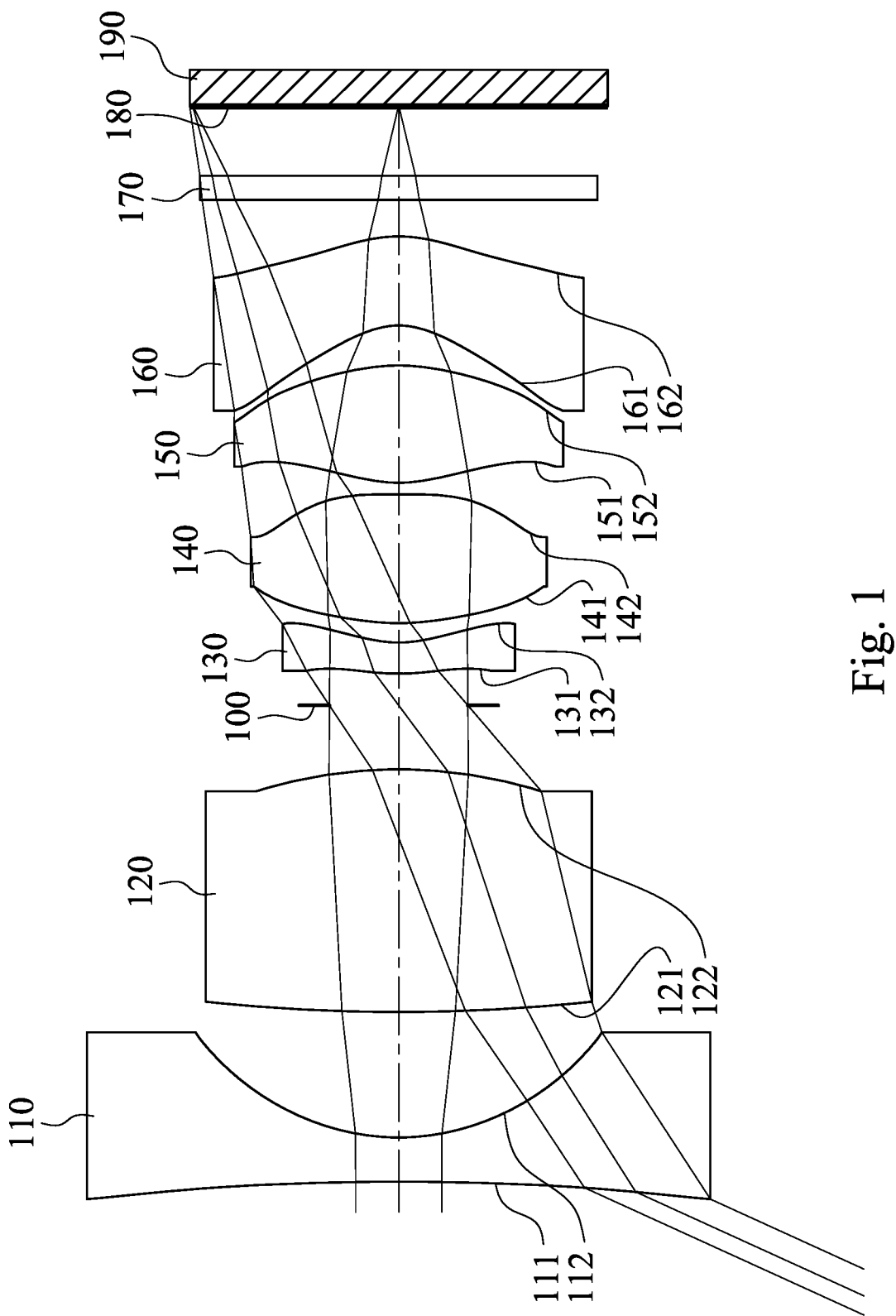
FIG. 1 is a schematic view of an imaging apparatus according to the 1st embodiment of the present disclosure.

An imaging lens assembly includes six lens elements, the six lens elements being, in order from an object side to an image side, a first lens element, a second lens element, a third lens element, a fourth lens element, a fifth lens element and a sixth lens element.

According to the imaging lens assembly of the present disclosure, there is an air space in a paraxial region between every adjacent lens elements of the first lens element, the second lens element, the third lens element, the fourth lens element, the fifth lens element and the sixth lens element. That is, each of the first through sixth lens elements is a single and non-cemented lens element, and there is a space between every adjacent lens elements. The manufacturing process of the cemented lenses is more complex than the non-cemented lenses. In particular, a cementing surface of one lens element and the following lens element need to have accurate curvature to ensure these two lens elements being highly cemented. However, during the cementing process, these two lens elements might not be highly cemented due to displacements and it is thereby not favorable for image quality of the imaging lens assembly. Therefore, according to the imaging lens assembly of the present disclosure, having an air space in a paraxial region between every adjacent lens elements avoids the problem generated by the cemented lens elements.

The first lens element has negative refractive power, which is favorable for forming a short focal length lens structure so as to allow light with large angle of view to enter the imaging lens assembly, thus, the light receiving range can be enlarged for wider application.

The second lens element has positive refractive power, which is favorable for balancing the negative refractive power of the first lens element so as to moderate the incident light with large field of view and reduce the sensitivity of the imaging lens assembly. The second lens element can have an image-side surface being convex in a paraxial region thereof. Therefore, the incident light with large field of view of the first lens element can be moderated by controlling the shape of the image-side surface of the second lens element, and aberrations thereof can further be corrected so as to achieve the characteristics of wide field of view and high image quality.

The third lens element can have negative refractive power, so that it is favorable for correcting aberrations of the imaging lens assembly by controlling the refractive power of the third lens element, and therefore enhancing the image quality effectively. The third lens element can have an image-side surface being concave in a paraxial region thereof. Therefore, it is favorable for correcting the spherical aberration of the imaging lens assembly by controlling the shape of the image-side surface of the third lens element, and guiding the light with large field of view into the imaging lens assembly.

The fourth lens element can have positive refractive power, and can have an object-side surface being convex in a paraxial region thereof and an image-side surface being concave in a paraxial region thereof. Therefore, the refractive power of the imaging lens assembly can be balanced by controlling the refractive power of the fourth lens element, so that the sensitivity can be reduced effectively and the image quality can be optimized. Moreover, it is favorable for reducing the total track length of the imaging lens assembly and correcting aberrations by controlling the surface shape of the fourth lens element. Furthermore, at least one surface of the fourth lens element can include at least one inflection point, so that it is favorable for correcting aberrations in an off-axis region of the imaging lens assembly and reducing the total track length thereof by adjusting the variation of the surface shape of the fourth lens element.

The fifth lens element has positive refractive power, so that the light converging ability can be provided so as to reduce the total track length of the imaging lens assembly and to achieve the purpose of compact size. The fifth lens element can have an object-side surface being convex in a paraxial region thereof and including at least one concave shape in an off-axis region thereof. The incident angle of the off-axis field of view on the image surface can be reduced by adjusting the shape variation of the object-side surface of the fifth lens element, and hence the image illumination can be maintained and off-axis aberration of the imaging lens assembly can be corrected for enhancing the image quality.

The sixth lens element can have an object-side surface being concave in a paraxial region thereof, so that it is favorable for correcting astigmatism of the imaging lens assembly by controlling the shape of the object-side surface of the sixth lens element so as to maintain the image quality. The sixth lens element can have an image-side surface being convex in a paraxial region thereof, so that it is favorable for obtaining sufficient back focal length by controlling the shape of the image-side surface of the sixth lens element so as to increase the illumination of the image surface and the flexibility of the mechanical design. Furthermore, at least one of the object-side surface and the image-side surface of the sixth lens element can include at least one inflection point. Therefore, it is favorable for receiving off-axis light by adjusting the variation of the surface shape of the sixth lens element, so that the image illumination can be maintained and the image quality can be further optimized by avoiding the stray light caused by large angle of incident light and reducing the incident angle of the off-axis field of view on the image surface.

At least one surface of at least one of the first lens element, the second lens element, the third lens element, the fourth lens element, the fifth lens element and the sixth lens element can include at least one inflection point. Therefore, it is favorable for reducing number of the lens elements and also maintaining the quality of the off-axis image by the arrangement of the lens shape with the inflection point so as to reduce the total track length of the imaging lens assembly and obtain compactness.

At least three of the first lens element, the second lens element, the third lens element, the fourth lens element, the fifth lens element and the sixth lens element are made of plastic materials. Therefore, it is favorable for reducing manufacturing costs and obtaining compactness by properly arranging the material of each lens element.

When a focal length of the fifth lens element is f5, and a central thickness of the second lens element is CT2, the following condition is satisfied: $0.10<f5/CT2<1.40$. Therefore, it is favorable for arranging sufficient refractive power by controlling the ratio of the refractive power of the fifth lens element and the central thickness of the second lens element so as to obtain compactness. Further, the thickness of the second lens element can be adjusted for reducing the sensitivity, so that it is favorable for the light with a large viewing angle to enter into the imaging lens assembly and increasing manufacturing yield rate of the lens elements. Preferably, the following condition can be satisfied: $0.10<f5/CT2<1.20$. More preferably, the following condition can be satisfied: $0.20<f5/CT2<0.90$.

When a curvature radius of the image-side surface of the second lens element is R4, and a curvature radius of the object-side surface of the third lens element is R5, the following condition is satisfied: $(R4+R5)/(R4-R5)<0.75$. Therefore, it is favorable for the light with a large viewing angle to enter into the imaging lens assembly and correct spherical aberrations thereof by adjusting the surface variation of the image-side surface of the second lens element and the object-side surface of the third lens element so as to satisfy demands of wide field of view and high image quality. Preferably, the following condition can be satisfied: $-3.0<(R4+R5)/(R4-R5)<0.50$.

When the curvature radius of the object-side surface of the third lens element is R5, and a curvature radius of the image-side surface of the third lens element is R6, the following condition is satisfied: $-3.50<(R5+R6)/(R5-R6)$. Therefore, it is favorable for correcting spherical aberrations of the imaging lens assembly by controlling the shape of the third lens element. Preferably, the following condition can be satisfied: $-0.30<(R5+R6)/(R5-R6)$. More preferably, the following condition can be satisfied: $0.45<(R5+R6)/(R5-R6)$. Furthermore, the following condition can be satisfied: $1.0<(R5+R6)/(R5-R6)<4.50$.

When a curvature radius of the object-side surface of the fourth lens element is R7, and a curvature radius of the image-side surface of the fourth lens element is R8, the following condition is satisfied: $(R7+R8)/(R7-R8)<1.50$. Therefore, it is favorable for effectively correcting aberrations of the imaging lens assembly by controlling the shape of the fourth lens element so as to enhance the image quality. Preferably, the following condition can be satisfied: $-5.0<(R7+R8)/(R7-R8)<0.75$.

When the focal length of the fifth lens element is f5, the central thickness of the second lens element is CT2, and an axial distance between the first lens element and the second lens element is T12, the following condition is satisfied: $0.30<f5/CT2+f5/T12<3.50$. Therefore, the refractive power of the fifth lens element, the thickness of the second lens element and the distance between the first lens element and the second lens element can be adjusted, so that it is favorable for obtaining the balance among compactness, sensitivity and assembling yield rate by balancing space utilization efficiency of the imaging lens assembly. Preferably, the following condition can be satisfied: $0.50<f5/CT2+f5/T12<2.50$.

When the curvature radius of the image-side surface of the second lens element is R4, and the curvature radius of the image-side surface of the third lens element is R6, the following condition is satisfied: $-0.30<(R4+R6)/(R4-R6)<0.75$. Therefore, it is favorable for light with a large viewing angle traveling in the imaging lens assembly and correcting aberrations by adjusting the shape variation of the image-side surface of the second lens element and the image-side surface of the third lens element so as to balance the characteristics of wide field of view, low sensitivity and good image quality. Preferably, the following condition can be satisfied: $0.15<(R4+R6)/(R4-R6)<0.75$.

When half of a maximum field of view of the imaging lens assembly is HFOV, the following condition is satisfied: $1/|\tan(HFOV)|<1.20$. Therefore, it is favorable for increasing angle of view effectively so as to expand the applicable range of products. Preferably, the following condition can be satisfied: $1/|\tan(HFOV)|<0.85$. More preferably, the following condition can be satisfied: $1/|\tan(HFOV)|<0.70$.

The imaging lens assembly can further include an aperture stop, which is to disposed on an object side of the third lens element. Therefore, it is favorable for increasing image receiving efficiency of the image sensor and maintaining sufficient viewing angle by controlling the position of the aperture stop.

When a composite focal length of the lens elements disposed between an imaged object and the aperture stop is fG1, and a composite focal length of the lens elements disposed between the aperture stop and an image surface is fG2, the following condition is satisfied: $0<fG2/fG1<2.0$. Therefore, it is favorable for balancing compactness and large viewing angle by adjusting the power arrangement of both the object side and the image side of the imaging lens assembly. More preferably, the following condition can be satisfied: $0<fG2/fG1<1.0$.

When a focal length of the imaging lens assembly is f, and an axial distance between the object-side surface of the first lens element and the image surface is TL, the following condition is satisfied: $0<f/TL<0.20$. Therefore, it is favorable for enlarging the imaging range by enhancing the characteristic of short focal length of the imaging lens assembly so as to be more applicable to the electronic devices.

When an f-number of the imaging lens assembly is Fno, the following condition is satisfied: $1.0<Fno<3.0$. Therefore, amount of incident light can be controlled so as to increase the illumination of the image surface, thus, it is favorable for the imaging apparatus including the imaging lens assembly to obtain sufficient information under situations such as insufficient external light source (i.e. nighttime) or dynamic photographing (under short exposure time) etc., so that the electronic device including the imaging apparatus can obtain the image with certain quality after calculate by the processor so as to increase the using opportunities thereof. More preferably, the following condition can be satisfied: $1.0<Fno<2.40$.

When an Abbe number of the third lens element is V3, the following condition is satisfied: $10.0<V3<30.0$. Therefore, it is favorable for effectively correcting chromatic aberrations of the imaging lens assembly by controlling the material of the third lens element, so that the image overlap can be avoided to enhance the image quality.

When a curvature radius of the object-side surface of the second lens element is R3, and the curvature radius of the image-side surface of the second lens element is R4, the following condition is satisfied: $0<(R3-R4)/(R3+R4)<2.20$. Therefore, it is favorable for moderating the incident light with large viewing angle, reducing the sensitivity on the object side of the imaging lens assembly and correcting aberrations by controlling the shape of the second lens element.

When the focal length of the fifth lens element is f5, and the axial distance between the first lens element and the second lens element is T12, the following condition is satisfied: $0.30<f5/T12<2.50$. Therefore, it is favorable for obtaining sufficient positive refractive power of the imaging lens assembly by controlling the refractive power of the fifth lens element so as to reduce the total track length of the imaging lens assembly, and further, it is also favorable for forming short focal length structure by properly adjusting the distance between the first lens element and the second lens element so as to obtain enough viewing angle and increase assembling yield rate.

When an axial distance between the image-side surface of the sixth lens element and the image surface is BL, and the central thickness of the second lens element is CT2, the following condition is satisfied: $0<BL/CT2<0.75$. Therefore, it is favorable for light with large viewing angle to travel in the imaging lens assembly by adjusting the ratio between the back focal length thereof and the thickness of the second lens element, so that the sensitivity, compactness and the image illumination can be balanced.

When a refractive power of the third lens element is P3, a refractive power of the fourth lens element is P4, a refractive power of the fifth lens element is P5, and a refractive power of the sixth lens element is P6, the following condition is satisfied: $(|P3|+|P4|+|P6|)/|P5|<2.50$. Therefore, it is favorable for enhancing abilities of aberration correction and light convergence on the image side of the imaging lens assembly by adjusting the refractive power of each lens element thereon, thus, good image quality and compactness can be obtained so as to be more applicable to the electronic devices.

When an Abbe number of the second lens element is V2, the Abbe number of the third lens element is V3, and an Abbe number of the sixth lens element is V6, the following condition is satisfied: $30.0<V2+V3+V6<105.0$. Therefore, it is favorable for effectively decreasing f-theta distortion caused by large viewing angle by adjusting the material of each lens element, so that the image distortion can be avoided and the image resolution can be increased effectively. More preferably, the following condition can be satisfied: $30.0<V2+V3+V6<90.0$.

When a refractive index of the first lens element is N1, and a refractive index of the second lens element is N2, the following condition is satisfied: $3.45<N1+N2<4.50$. Therefore, it is favorable for enhancing the adaptability of the imaging lens assembly under different environments by adjusting the materials of the lens elements on the object side thereof, so that the normal operation and good image quality can be maintained under different temperatures and humidity.

When an axial distance between the aperture stop and the object-side surface of the third lens element is DsR5, and an axial distance between the aperture stop and the image-side surface of the third lens element is DsR6, the following condition is satisfied: $0.10<|DsR5/DsR6|<0.85$. Therefore, it is favorable for balancing the sufficient viewing angle and the light receiving rate of the image sensor by adjusting the position of the aperture stop. More preferably, the following condition can be satisfied: $0.10<|DsR5/DsR6|<0.75$.

When a central thickness of the sixth lens element is CT6, an axial distance between the fifth lens element and the sixth lens element is T56, the following conditions are satisfied: $0.50<CT6/T56<25.0$. Therefore, it is favorable for forming the lens element and obtaining high assembling yield rate simultaneously by adjusting the ratio between the central thickness of the sixth lens element and the distance between the fifth lens element and the sixth lens element.

Each of the aforementioned features of the imaging lens assembly can be utilized in various combinations for achieving the corresponding effects.

According to the imaging lens assembly of the present disclosure, the lens elements thereof can be made of glass or plastic materials. When the lens elements are made of glass materials, the distribution of the refractive power of the imaging lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the imaging lens assembly. Therefore, the total track length of the imaging lens assembly can also be reduced.

According to the imaging lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the imaging lens assembly of the present disclosure, the refractive power or the focal length of a lens element being positive or negative may refer to the refractive power or the focal length in a paraxial region of the lens element.

According to the imaging lens assembly of the present disclosure, the imaging lens assembly can include at least one stop, such as an aperture stop, a glare stop or a field stop. Said glare stop or said field stop is for eliminating the stray light and thereby improving the image resolution thereof.

According to the imaging lens assembly of the present disclosure, the image surface of the imaging lens assembly, based on the corresponding image sensor, can be flat or curved. In particular, the image surface can be a concave curved surface facing towards the object side. According to the imaging lens assembly of the present disclosure, at least one image correcting element (such as a field flattener) can be selectively disposed between the lens element closest to the image side of the imaging lens assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the imaging lens assembly of the present disclosure, an aperture stop can be configured as a front stop or a middle stop. A front stop disposed between an object and the first lens element can provide a longer distance between an exit pupil of the imaging lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the imaging lens assembly and thereby provides a wider field of view for the same.

According to the imaging lens assembly of the present disclosure, the imaging lens assembly can be applied to, in products such as car lens assemblies, ADAS (Advanced Driver Assistance Systems), lane departure warning systems, blind spot monitoring, multiple lens devices, aerial vehicles, sport cameras, portable image recorders, various smart electronic devices, wearable devices, digital cameras, surveillance systems, human-computer interaction platforms and so on.

According to the present disclosure, an imaging apparatus is provided. The imaging apparatus includes the aforementioned imaging lens assembly and an image sensor, wherein the image sensor is disposed on the image side of the aforementioned imaging lens assembly, that is, the image sensor can be disposed on or near the image surface of the aforementioned imaging lens assembly. By properly arranging the optical and mechanism elements, characteristics of sufficient view angle, compactness, anti-environmental change and high image quality can be obtained, and it is favorable for mass production and lower cost so as to be applied to a wider range of products. Preferably, the imaging apparatus can further include a barrel member, a holder member or a combination thereof.

According to the present disclosure, an electronic device is provided, which includes the aforementioned imaging apparatus. Preferably, the electronic device can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2:
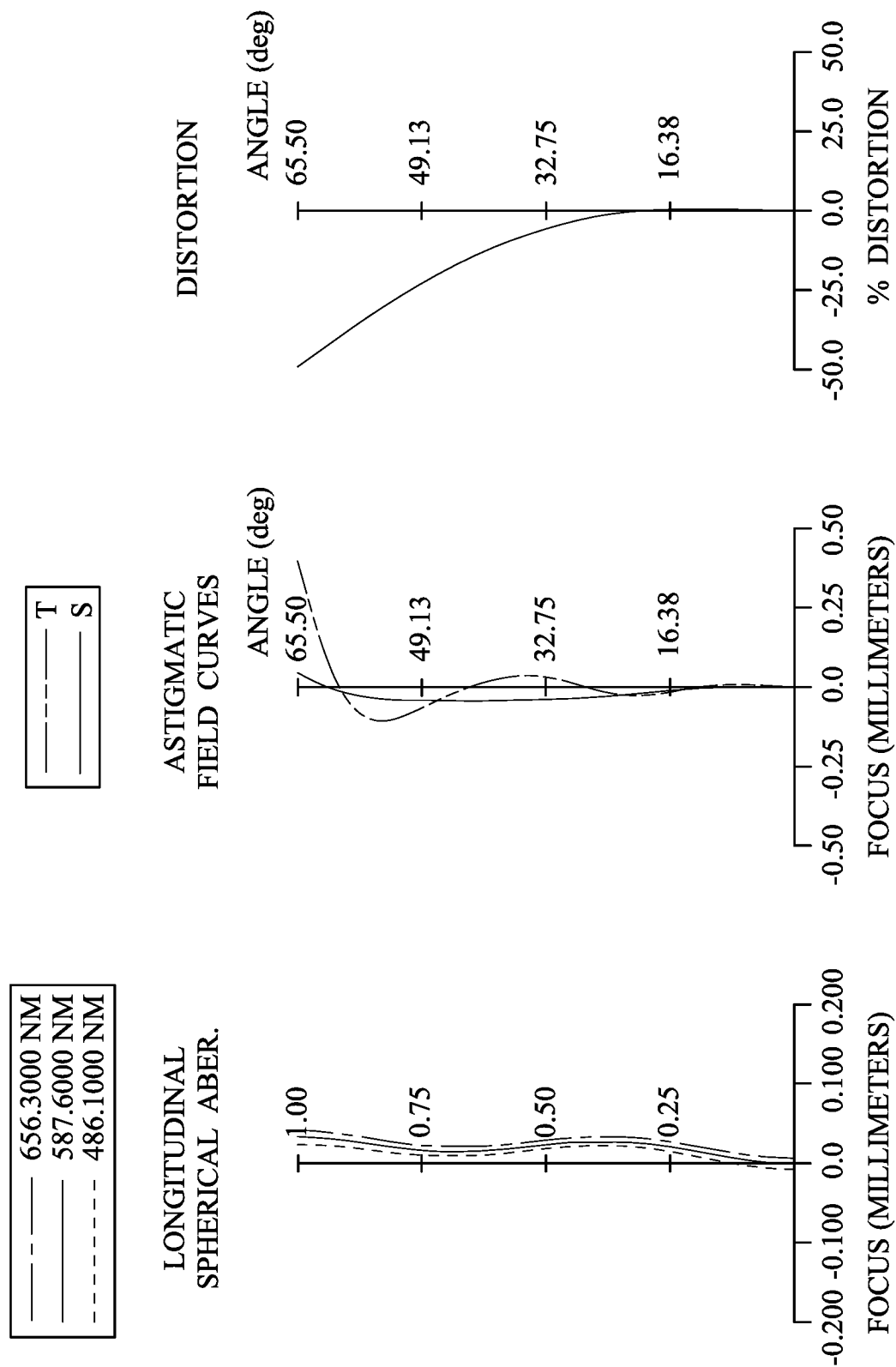
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an imaging lens assembly (its reference numeral is omitted) and an image sensor 190. The imaging lens assembly includes, in order from an object side to an image side, a first lens element 110, a second lens element 120, an aperture stop 100, a third lens element 130, a fourth lens element 140, a fifth lens element 150, a sixth lens element 160, a filter 170 and an image surface 180, wherein the image sensor 190 is disposed on the image surface 180 of the imaging lens assembly. The imaging lens assembly includes six lens elements (110, 120, 130, 140, 150, 160) without additional one or more lens elements inserted between the first lens element 110 and the sixth lens element 160, and each of the first lens element 110, the second lens element 120, the third lens element 130, the fourth lens element 140, the fifth lens element 150 and the sixth lens element 160 is a single and non-cemented lens element.

The first lens element 110 with negative refractive power has an object-side surface 111 being concave in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of a glass material, and has the object-side surface 121 and the image-side surface 122 being both spherical.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

Figure 19:
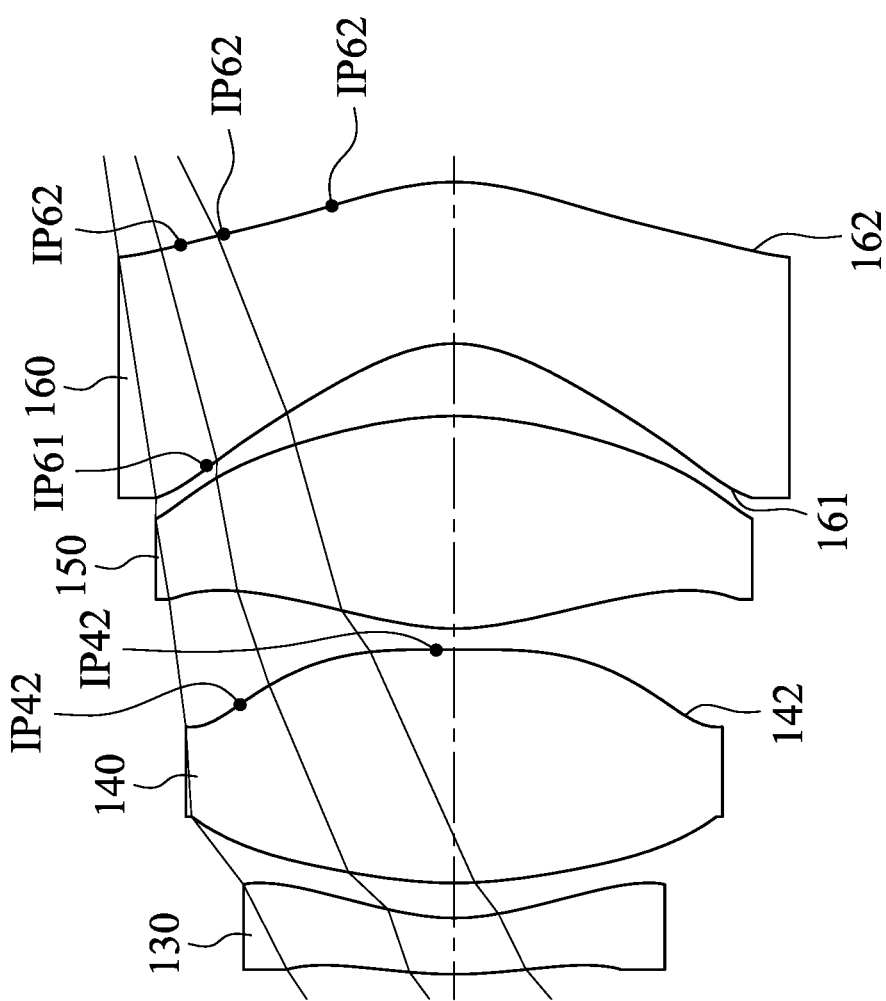
FIG. 19 shows a schematic view of inflection points of the fourth lens element and the sixth lens element according to the 1st embodiment of FIG. 1.

The fourth lens element 140 with positive refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric. Furthermore, FIG. 19 shows a schematic view of inflection points of the fourth lens element 140 and the sixth lens element 160 according to the 1st embodiment of FIG. 1. In FIG. 19, the image-side surface 142 of the fourth lens element 140 includes at least one inflection point IP42.

The fifth lens element 150 with positive refractive power has an object-side surface 151 being convex in a paraxial region thereof and an image-side surface 152 being convex in a paraxial region thereof. The fifth lens element 150 is made of a plastic material, and has the object-side surface 151 and the image-side surface 152 being both aspheric. Furthermore, the object-side surface 151 of the fifth lens element 150 includes a concave shape in an off-axis region thereof.

The sixth lens element 160 with negative refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric. Furthermore, in FIG. 19, each of the object-side surface 161 and the image-side surface 162 of the sixth lens element 160 includes at least one inflection point IP61, IP62.

The filter 170 is made of a glass material and located between the sixth lens element 160 and the image surface 180, and will not affect the focal length of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of a maximum field of view of the imaging lens assembly is HFOV, these parameters have the following values: f=3.05 mm; Fno=2.15; and HFOV=65.5 degrees.

In the imaging lens assembly according to the 1st embodiment, when half of a maximum field of view of the imaging lens assembly is HFOV, the following condition is satisfied: 1/|tan(HFOV)|=0.46.

In the imaging lens assembly according to the 1st embodiment, when an Abbe number of the second lens element 120 is V2, an Abbe number of the third lens element 130 is V3, and an Abbe number of the sixth lens element 160 is V6, the following conditions are satisfied: V3=23.5; and V2+V3+V6=80.8.

In the imaging lens assembly according to the 1st embodiment, when a refractive index of the first lens element 110 is N1, and a refractive index of the second lens element 120 is N2, the following condition is satisfied: N1+N2=3.193.

In the imaging lens assembly according to the 1st embodiment, when a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following conditions are satisfied: (R3−R4)/(R3+R4)=1.71; (R4+R5)/(R4−R5)=0.34; (R5+R6)/(R5−R6)=3.25; (R4+R6)/(R4−R6)=0.59; and (R7+R8)/(R7−R8)=−1.22.

In the imaging lens assembly according to the 1st embodiment, when a central thickness of the sixth lens element 160 is CT6, and an axial distance between the fifth lens element 150 and the sixth lens element 160 is T56, the following condition is satisfied: CT6/T56=2.23.

In the imaging lens assembly according to the 1st embodiment, when the focal length of the imaging lens assembly is f, and an axial distance between the object-side surface 111 of the first lens element 110 and the image surface 180 is TL, the following condition is satisfied: f/TL=0.17.

In the imaging lens assembly according to the 1st embodiment, when a focal length of the fifth lens element 150 is f5, a central thickness of the second lens element 120 is CT2, and an axial distance between the first lens element 110 and the second lens element 120 is T12, the following conditions are satisfied: f5/CT2=0.72; f5/T12=1.38; and f5/CT2+f5/T12=2.10.

In the imaging lens assembly according to the 1st embodiment, when a composite focal length of the lens elements disposed between an imaged object and the aperture stop 100 is fG1 (in the 1st embodiment, fG1 is the composite focal length of the first lens element 110 and the second lens element 120), and a composite focal length of the lens elements disposed between the aperture stop 100 and the image surface 180 is fG2 (in the 1st embodiment, fG1 is the composite focal length of the third lens element 130, the fourth lens element 140, the fifth lens element 150 and the sixth lens element 160), the following condition is satisfied: fG2/fG1=0.05.

In the imaging lens assembly according to the 1st embodiment, when an axial distance between the image-side surface 162 of the sixth lens element 160 and the image surface 180 is BL, and the central thickness of the second lens element 120 is CT2, the following condition is satisfied: BL/CT2=0.54.

In the imaging lens assembly according to the 1st embodiment, when a refractive power of the third lens element 130 is P3 (which is f/f3, a ratio of the focal length of the imaging lens assembly f to the focal length of the third lens element f3), a refractive power of the fourth lens element is P4 (which is f/f4, a ratio of the focal length of the imaging lens assembly f to the focal length of the fourth lens element f4), a refractive power of the fifth lens element is P5 (which is f/f5, a ratio of the focal length of the imaging lens assembly f to the focal length of the fifth lens element f5), a refractive power of the sixth lens element is P6 (which is f/f6, a ratio of the focal length of the imaging lens assembly f to the focal length of the sixth lens element f6), the following condition is satisfied: (|P3|+|P4|+|P6|)/|P5|=0.97.

In the imaging lens assembly according to the 1st embodiment, when an axial distance between the aperture stop 100 and the object-side surface 131 of the third lens element 130 is DsR5, and an axial distance between the aperture stop 100 and the image-side surface 132 of the third lens element 130 is DsR6, the following condition is satisfied: |DsR5/DsR6|=0.51.

The detailed optical data of the 1st embodiment are shown in Table 1 and the aspheric surface data are shown in Table 2 below.

TABLE 1

1st Embodiment
f = 3.05 mm, Fno = 2.15, HFOV = 65.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −47.619 | ASP | 0.730 | Plastic | 1.545 | 56.1 | −6.56 |
| 2 | | 3.887 | ASP | 2.067 | | | | |
| 3 | Lens 2 | 29.851 | | 4.000 | Glass | 1.648 | 33.8 | 9.98 |
| 4 | | −7.816 | | 1.054 | | | | |
| 5 | Ape. Stop | Plano | | 0.526 | | | | |
| 6 | Lens 3 | 3.864 | ASP | 0.512 | Plastic | 1.639 | 23.5 | −7.63 |
| 7 | | 2.044 | ASP | 0.319 | | | | |
| 8 | Lens 4 | 4.213 | ASP | 2.122 | Plastic | 1.534 | 55.9 | 8.60 |

TABLE 1-continued

1st Embodiment
f = 3.05 mm, Fno = 2.15, HFOV = 65.5 deg.

| Surface # | | Curvature Radius | Thickness | Material | Index | Abbe # | Focal Length |
|---|---|---|---|---|---|---|---|
| 9 | | 42.145 ASP | 0.192 | | | | |
| 10 | Lens 5 | 2.257 ASP | 1.932 | Plastic | 1.534 | 55.9 | 2.86 |
| 11 | | −3.322 ASP | 0.660 | | | | |
| 12 | Lens 6 | −1.249 ASP | 1.469 | Plastic | 1.639 | 23.5 | −10.93 |
| 13 | | −2.218 ASP | 0.600 | | | | |
| 14 | Filter | Plano | 0.400 | Glass | 1.517 | 64.2 | — |
| 15 | | Plano | 1.145 | | | | |
| 16 | Image | Plano | — | | | | |

Reference wavelength is 587.6 nm (d-line).

TABLE 2

Aspheric Coefficients

| | Surface # | | | | |
|---|---|---|---|---|---|
| | 1 | 2 | 6 | 7 | 8 |
| k = | 4.9854E+00 | 1.3697E−01 | −6.5311E+00 | −5.7852E−01 | −2.7087E+01 |
| A4 = | 7.7914E−05 | −1.8160E−03 | −5.6598E−02 | −9.4563E−02 | 3.1136E−02 |
| A6 = | −1.2089E−05 | 1.5042E−04 | 1.6320E−02 | 2.5956E−02 | −2.8719E−02 |
| A8 = | 3.3358E−07 | −2.0208E−05 | −2.6707E−03 | −4.8901E−03 | 1.3437E−02 |
| A10 = | | | −7.4502E−04 | 2.6819E−04 | −3.1342E−03 |
| A12 = | | | 1.0026E−04 | 1.2796E−06 | 3.6925E−04 |
| A14 = | | | | | −1.7461E−05 |

| | Surface # | | | | |
|---|---|---|---|---|---|
| | 9 | 10 | 11 | 12 | 13 |
| k = | 7.2731E+01 | −7.8198E+00 | 2.3754E−01 | −1.4613E+00 | −1.1393E+00 |
| A4 = | −1.1055E−01 | −2.7027E−02 | 2.5391E−02 | 7.1873E−02 | 4.7878E−02 |
| A6 = | 6.1655E−02 | 1.6522E−02 | −5.6537E−03 | −3.1275E−02 | −6.5783E−03 |
| A8 = | −2.8896E−02 | −7.3257E−03 | 1.2025E−03 | 9.5044E−03 | −1.0836E−04 |
| A10 = | 8.9462E−03 | 1.7527E−03 | −1.8492E−04 | −1.8710E−03 | 2.2055E−04 |
| A12 = | −1.7024E−03 | −2.1231E−04 | 1.2391E−05 | 1.9796E−04 | −4.1130E−05 |
| A14 = | 1.8233E−04 | 1.0065E−05 | | −8.2579E−06 | 3.4475E−06 |
| A16 = | −8.2423E−06 | | | | −1.1128E−07 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
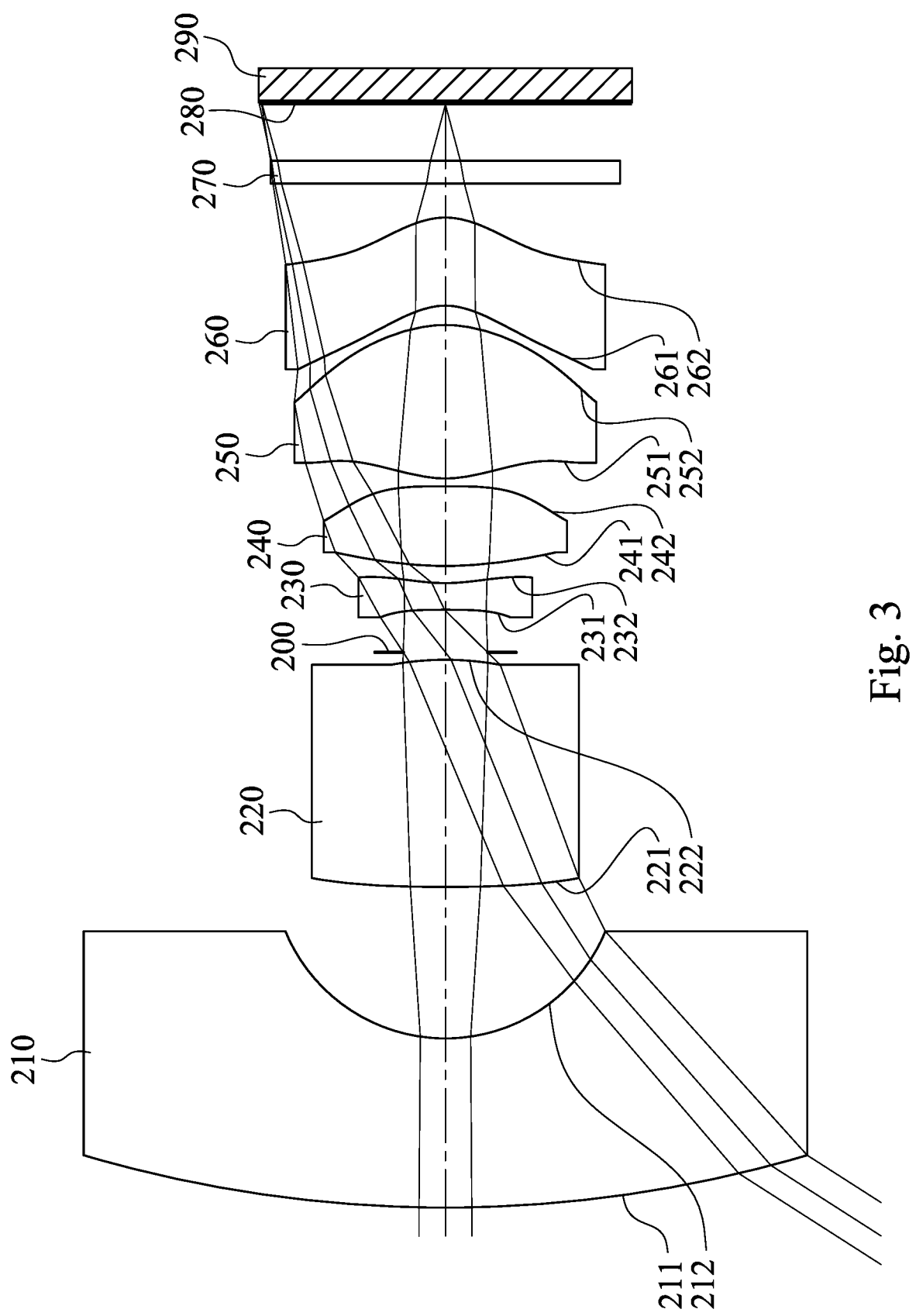
FIG. 3 is a schematic view of an imaging apparatus according to the 2nd embodiment of the present disclosure.
Figure 4:
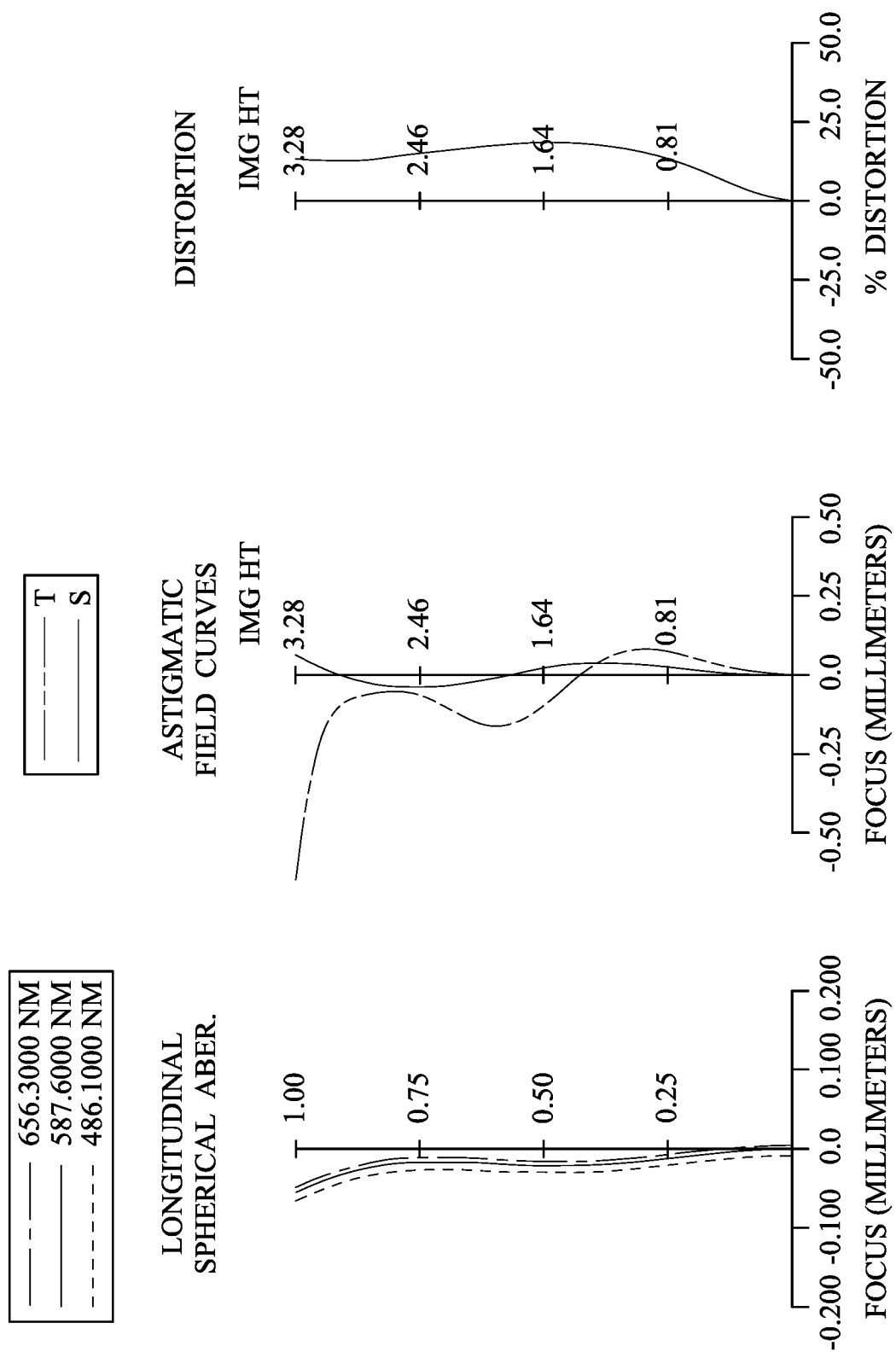
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an imaging lens assembly (its reference numeral is omitted) and an image sensor 290. The imaging lens assembly includes, in order from an object side to an image side, a first lens element 210, a second lens element 220, an aperture stop 200, a third lens element 230, a fourth lens element 240, a fifth lens element 250, a sixth lens element 260, a filter 270 and an image surface 280, wherein the image sensor 290 is disposed on the image surface 280 of the imaging lens assembly. The imaging lens assembly includes six lens elements (210, 220, 230, 240, 250, 260) without additional one or more lens elements inserted between the first lens element 210 and the sixth lens element 260, and each of the first lens element 210, the second lens element 220, the third lens element 230, the fourth lens element 240, the fifth lens element 250 and the sixth lens element 260 is a single and non-cemented lens element.

The first lens element 210 with negative refractive power has an object-side surface 211 being convex in a paraxial region thereof and an image-side surface 212 being concave in a paraxial region thereof. The first lens element 210 is made of a glass material, and has the object-side surface 211 and the image-side surface 212 being both spherical.

The second lens element 220 with positive refractive power has an object-side surface 221 being convex in a paraxial region thereof and an image-side surface 222 being convex in a paraxial region thereof. The second lens element 220 is made of a plastic material, and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric. Furthermore, each of the object-side surface 241 and the image-side surface 242 of the fourth lens element 240 includes at least one inflection point.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric. Furthermore, the object-side surface 251 of the fifth lens element 250 includes a concave shape in an off-axis region thereof.

The sixth lens element 260 with positive refractive power has an object-side surface 261 being concave in a paraxial region thereof and an image-side surface 262 being convex in a paraxial region thereof. The sixth lens element 260 is made of a plastic material, and has the object-side surface 261 and the image-side surface 262 being both aspheric. Furthermore, each of the object-side surface 261 and the image-side surface 262 of the sixth lens element 260 includes at least one inflection point.

The filter 270 is made of a glass material and located between the sixth lens element 260 and the image surface 280, and will not affect the focal length of the imaging lens assembly.

The detailed optical data of the 2nd embodiment are shown in Table 3 and the aspheric surface data are shown in Table 4 below.

TABLE 3

2nd Embodiment
f = 1.86 mm, Fno = 2.00, HFOV = 57.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 22.432 | | 2.977 | Glass | 1.518 | 59.0 | −7.16 |
| 2 | | 3.041 | | 2.667 | | | | |
| 3 | Lens 2 | 36.436 | ASP | 4.000 | Plastic | 1.614 | 26.0 | 7.73 |
| 4 | | −5.224 | ASP | 0.129 | | | | |
| 5 | Ape. Stop | Plano | | 0.751 | | | | |
| 6 | Lens 3 | −24.390 | ASP | 0.470 | Plastic | 1.660 | 20.4 | −4.36 |
| 7 | | 3.287 | ASP | 0.300 | | | | |
| 8 | Lens 4 | 6.925 | ASP | 1.402 | Plastic | 1.534 | 55.9 | 13.38 |
| 9 | | 212.185 | ASP | 0.140 | | | | |
| 10 | Lens 5 | 2.033 | ASP | 2.700 | Plastic | 1.534 | 55.9 | 2.58 |
| 11 | | −2.303 | ASP | 0.341 | | | | |
| 12 | Lens 6 | −1.156 | ASP | 1.551 | Plastic | 1.660 | 20.4 | 4.57 |
| 13 | | −1.281 | ASP | 0.600 | | | | |
| 14 | Filter | Plano | | 0.400 | Glass | 1.517 | 64.2 | — |
| 15 | | Plano | | 1.028 | | | | |
| 16 | image | Plano | | — | | | | |

Reference wavelength is 587.6 nm (d-line).

TABLE 4

Aspheric Coefficients

| Surface # | | | | | |
|---|---|---|---|---|---|
| | 3 | 4 | 6 | 7 | 8 |
| k = | 6.5468E+01 | 1.8446E−01 | 9.9000E+01 | −1.7489E−01 | −3.1045E+01 |
| A4 = | 3.1956E−03 | −1.3293E−04 | −2.7229E−02 | −7.1910E−02 | 1.9421E−02 |
| A6 = | −1.2762E−04 | 2.6523E−05 | −1.6559E−01 | −6.1994E−03 | −1.8725E−02 |
| A8 = | −1.7534E−06 | 7.2117E−05 | 2.8519E−01 | 2.6357E−02 | 8.6501E−03 |
| A10 = | | | −2.0923E−01 | −1.2994E−02 | −1.7691E−03 |
| A12 = | | | 5.5404E−02 | 1.9257E−03 | 1.3089E−04 |

| Surface # | | | | | |
|---|---|---|---|---|---|
| | 9 | 10 | 11 | 12 | 13 |
| k = | −9.9000E+01 | −6.6288E−00 | −4.2927E−01 | −2.5908E+00 | −1.8553E+00 |
| A4 = | −8.3201E−02 | −2.4662E−02 | 2.6186E−02 | 2.4051E−02 | 3.8883E−02 |
| A6 = | 3.0619E−02 | 7.9531E−03 | −8.2197E−03 | −6.4991E−03 | −2.7198E−03 |
| A8 = | −9.6767E−03 | −2.9509E−03 | 1.9777E−03 | 1.4859E−03 | −9.6938E−05 |
| A10 = | 1.7299E−03 | 4.8228E−04 | −2.4709E−04 | −2.0889E−04 | 5.2329E−06 |
| A12 = | −1.1300E−04 | −2.5993E−05 | 1.3761E−05 | 1.1422E−05 | 7.9462E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.86 | (R7 + R8)/(R7 − R8) | −1.07 |
| Fno | 2.00 | CT6/T56 | 4.55 |
| HFOV [deg.] | 57.3 | f/TL | 0.10 |
| 1/|tan(HFOV)| | 0.64 | f5/CT2 | 0.65 |
| V3 | 20.4 | f5/T12 | 0.97 |
| V2 + V3 + V6 | 66.8 | f5/CT2 + f5/T12 | 1.61 |
| N1 + N2 | 3.132 | fG2/fG1 | 0.19 |
| (R3 − R4)/(R3 + R4) | 1.33 | BL/CT2 | 0.51 |
| (R4 + R5)/(R4 − R5) | −1.55 | (|P3| + |P4| + |P6|)/|P5| | 1.35 |
| (R5 + R6)/(R5 − R6) | 0.76 | |DsR5/DsR6| | 0.62 |
| (R4 + R6)/(R4 − R6) | 0.23 | | |

3rd Embodiment

Figure 5:
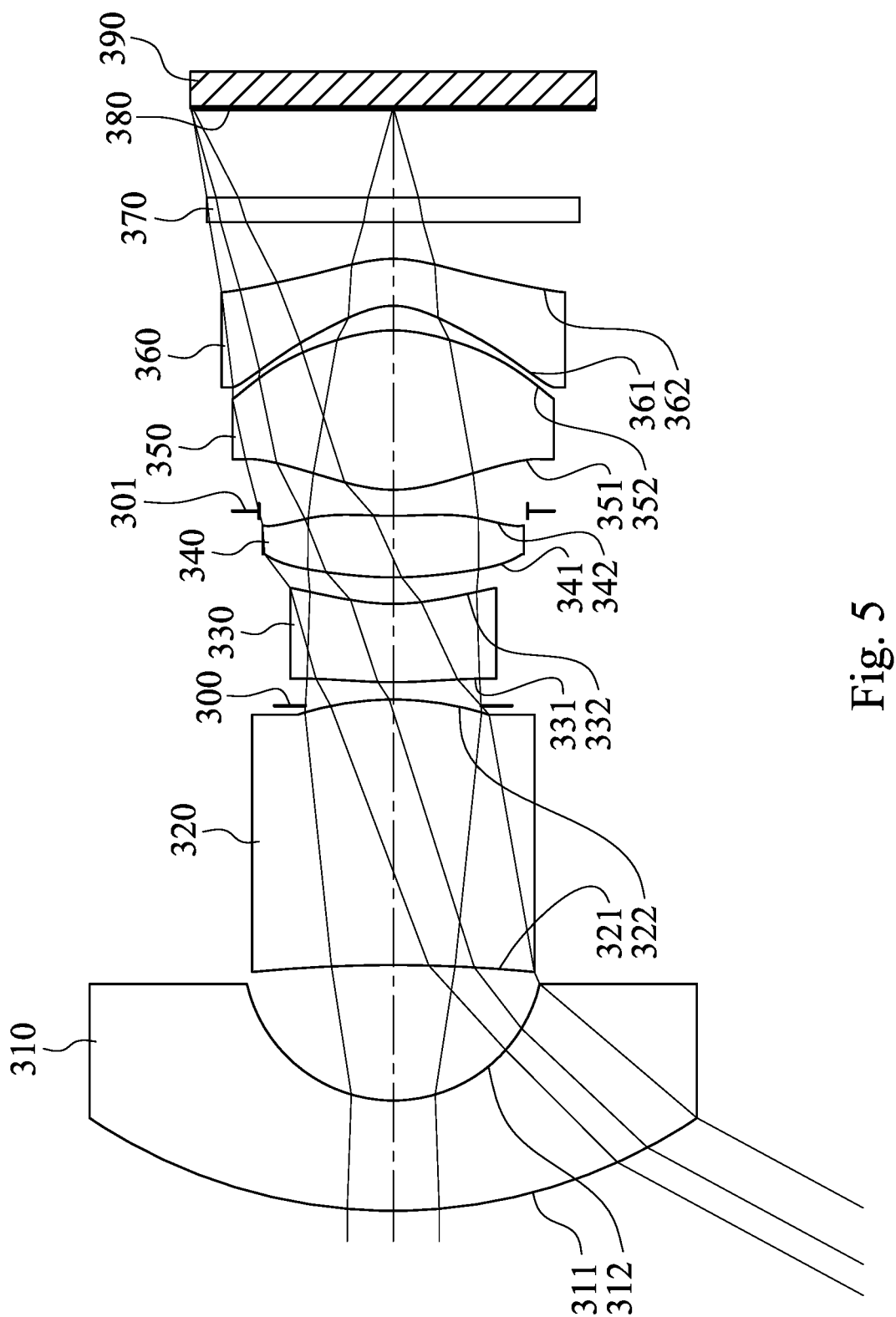
FIG. 5 is a schematic view of an imaging apparatus according to the 3rd embodiment of the present disclosure.
Figure 6:
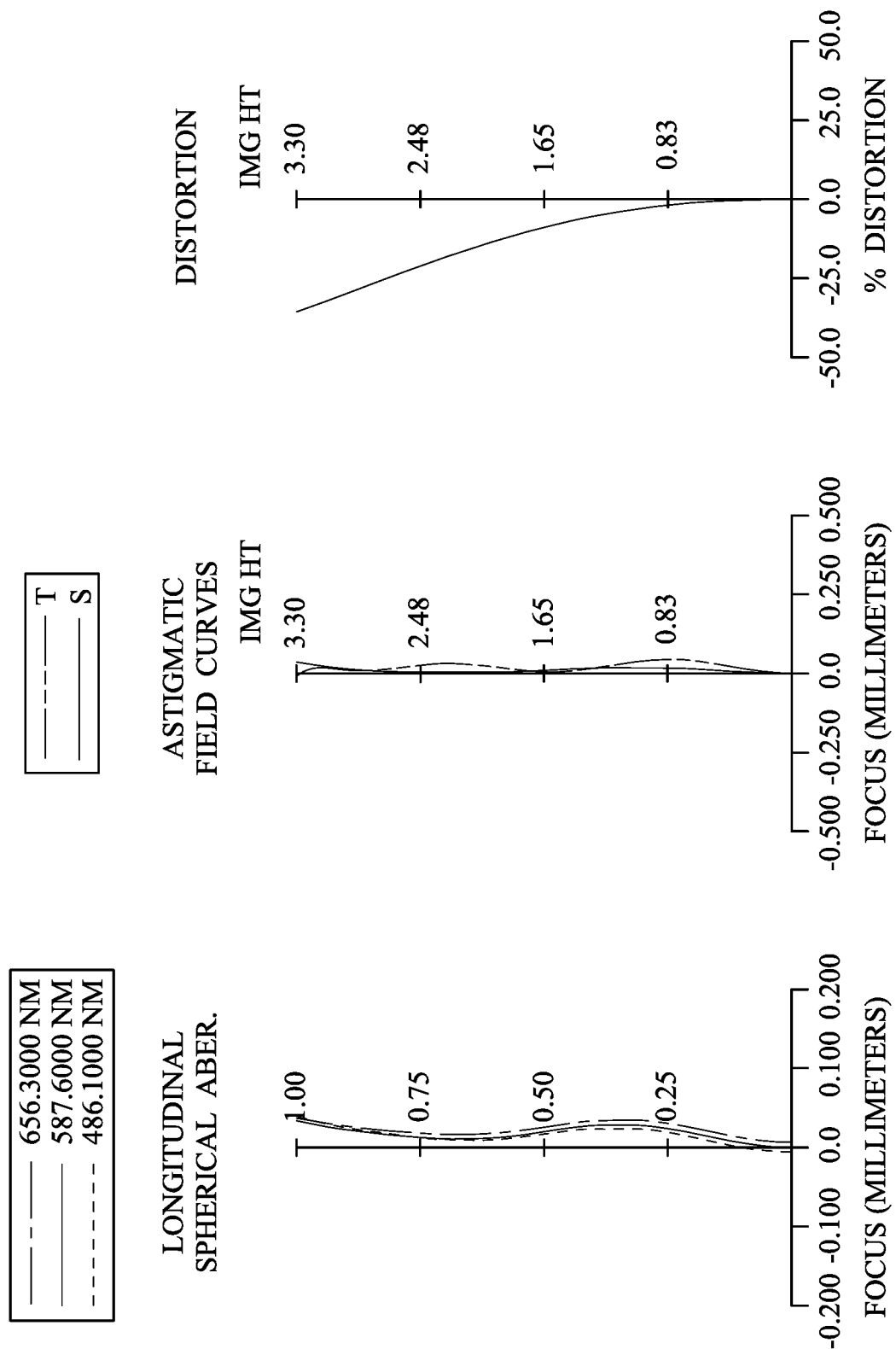
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an imaging lens assembly (its reference numeral is omitted) and an image sensor 390. The imaging lens assembly includes, in order from an object side to an image side, a first lens element 310, a second lens element 320, an aperture stop 300, a third lens element 330, a fourth lens element 340, a stop 301, a fifth lens element 350, a sixth lens element 360, a filter 370 and an image surface 380, wherein the image sensor 390 is disposed on the image surface 380 of the imaging lens assembly. The imaging lens assembly includes six lens elements (310, 320, 330, 340, 350, 360) without additional one or more lens elements inserted between the first lens element 310 and the sixth lens element 360, and each of the first lens element 310, the second lens element 320, the third lens element 330, the fourth lens element 340, the fifth lens element 350 and the sixth lens element 360 is a single and non-cemented lens element.

The first lens element 310 with negative refractive power has an object-side surface 311 being convex in a paraxial region thereof and an image-side surface 312 being concave in a paraxial region thereof. The first lens element 310 is made of a glass material, and has the object-side surface 311 and the image-side surface 312 being both spherical.

The second lens element 320 with positive refractive power has an object-side surface 321 being concave in a paraxial region thereof and an image-side surface 322 being convex in a paraxial region thereof. The second lens element 320 is made of a glass material, and has the object-side surface 321 and the image-side surface 322 being both spherical.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with positive refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the image-side surface 342 of the fourth lens element 340 includes at least one inflection point.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric. Furthermore, the object-side surface 351 of the fifth lens element 350 includes a concave shape in an off-axis region thereof.

The sixth lens element 360 with negative refractive power has an object-side surface 361 being concave in a paraxial region thereof and an image-side surface 362 being convex in a paraxial region thereof. The sixth lens element 360 is made of a plastic material, and has the object-side surface 361 and the image-side surface 362 being both aspheric. Furthermore, each of the object-side surface 361 and the image-side surface 362 of the sixth lens element 360 includes at least one inflection point.

The filter 370 is made of a glass material and located between the sixth lens element 360 and the image surface 380, and will not affect the focal length of the imaging lens assembly.

The detailed optical data of the 3rd embodiment are shown in Table 5 and the aspheric surface data are shown in Table 6 below.

TABLE 5

3rd Embodiment
f = 2.78 mm, Fno = 1.85, HFOV = 61.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.852 | | 1.800 | Glass | 1.729 | 54.7 | −5.27 |
| 2 | | 2.450 | | 2.212 | | | | |
| 3 | Lens 2 | −23.290 | | 4.335 | Glass | 1.834 | 37.3 | 6.93 |
| 4 | | −5.021 | | −0.101 | | | | |
| 5 | Ape. Stop | Plano | | 0.385 | | | | |
| 6 | Lens 3 | 8.898 | ASP | 1.278 | Plastic | 1.661 | 20.3 | −10.24 |
| 7 | | 3.623 | ASP | 0.432 | | | | |
| 8 | Lens 4 | 5.698 | ASP | 1.005 | Plastic | 1.534 | 55.9 | 46.39 |
| 9 | | 6.946 | ASP | 0.078 | | | | |
| 10 | Stop | Plano | | 0.347 | | | | |

TABLE 5-continued

3rd Embodiment
f = 2.78 mm, Fno = 1.85, HFOV = 61.6 deg.

| Surface # | | Curvature Radius | | Thickness | Material | Index | Abbe # | Focal Length |
|---|---|---|---|---|---|---|---|---|
| 11 | Lens 5 | 2.209 | ASP | 2.603 | Plastic | 1.534 | 55.9 | 2.63 |
| 12 | | −2.282 | ASP | 0.403 | | | | |
| 13 | Lens 6 | −1.116 | ASP | 0.766 | Plastic | 1.661 | 20.3 | −5.15 |
| 14 | | −2.116 | ASP | 0.600 | | | | |
| 15 | Filter | Plano | | 0.400 | Glass | 1.517 | 64.2 | — |
| 16 | | Plano | | 1.456 | | | | |
| 17 | Image | Plano | | — | | | | |

Reference wavelength is 587.6 nm (d-line).
Effective radius of stop on surface 10 is 2.190 mm.

TABLE 6

Aspheric Coefficients

| | Surface # | | | |
|---|---|---|---|---|
| | 6 | 7 | 8 | 9 |
| k = | −1.0530E+01 | 1.6847E+00 | −4.9962E+01 | 3.9762E+00 |
| A4 = | −1.2008E−02 | −2.9935E−02 | 6.7079E−03 | −9.2003E−02 |
| A6 = | 2.5309E−05 | 5.4842E−03 | −5.1811E−04 | 3.8986E−02 |
| A8 = | 8.4866E−07 | −3.5266E−03 | −1.3239E−03 | −1.3986E−02 |
| A10 = | −5.7699E−05 | 1.2696E−03 | 8.6532E−04 | 3.3214E−03 |
| A12 = | | −2.3365E−04 | −1.6460E−04 | −4.1857E−04 |
| A14 = | | 1.3406E−05 | 1.1024E−05 | 2.3025E−05 |

| | Surface # | | | |
|---|---|---|---|---|
| | 11 | 12 | 13 | 14 |
| k = | −5.9295E+00 | −6.8323E−01 | −2.7496E+00 | −3.4841E+00 |
| A4 = | −6.5412E−03 | 6.0309E−02 | 4.1659E−02 | 4.9628E−02 |
| A6 = | −3.8156E−04 | −2.5452E−02 | −2.5244E−02 | −1.8331E−02 |
| A8 = | 3.4415E−04 | 7.4116E−03 | 8.5175E−03 | 4.6613E−03 |
| A10 = | −1.2029E−04 | −1.5276E−03 | −1.8585E−03 | −8.0136E−04 |
| A12 = | 2.3391E−05 | 2.0794E−04 | 2.3930E−04 | 8.4019E−05 |
| A14 = | −1.9102E−06 | −1.6352E−05 | −1.5758E−05 | −4.6929E−06 |
| A16 = | | 5.6559E−07 | 4.0688E−07 | 1.0611E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.78 | (R7 + R8)/(R7 − R8) | −10.13 |
| Fno | 1.85 | CT6/T56 | 1.90 |
| HFOV [deg.] | 61.6 | f/TL | 0.15 |
| 1/|tan(HFOV)| | 0.54 | f5/CT2 | 0.61 |
| V3 | 20.3 | f5/T12 | 1.19 |
| V2 + V3 + V6 | 78.0 | f5/CT2 + f5/T12 | 1.80 |
| N1 + N2 | 3.563 | fG2/fG1 | 0.45 |
| (R3 − R4)/(R3 + R4) | 0.65 | BL/CT2 | 0.57 |
| (R4 + R5)/(R4 − R5) | −0.28 | (|P3| + |P4| + |P6|)/|P5| | 0.83 |
| (R5 + R6)/(R5 − R6) | 2.37 | |DsR5/DsR6| | 0.23 |
| (R4 + R6)/(R4 − R6) | 0.16 | | |

4th Embodiment

Figure 7:
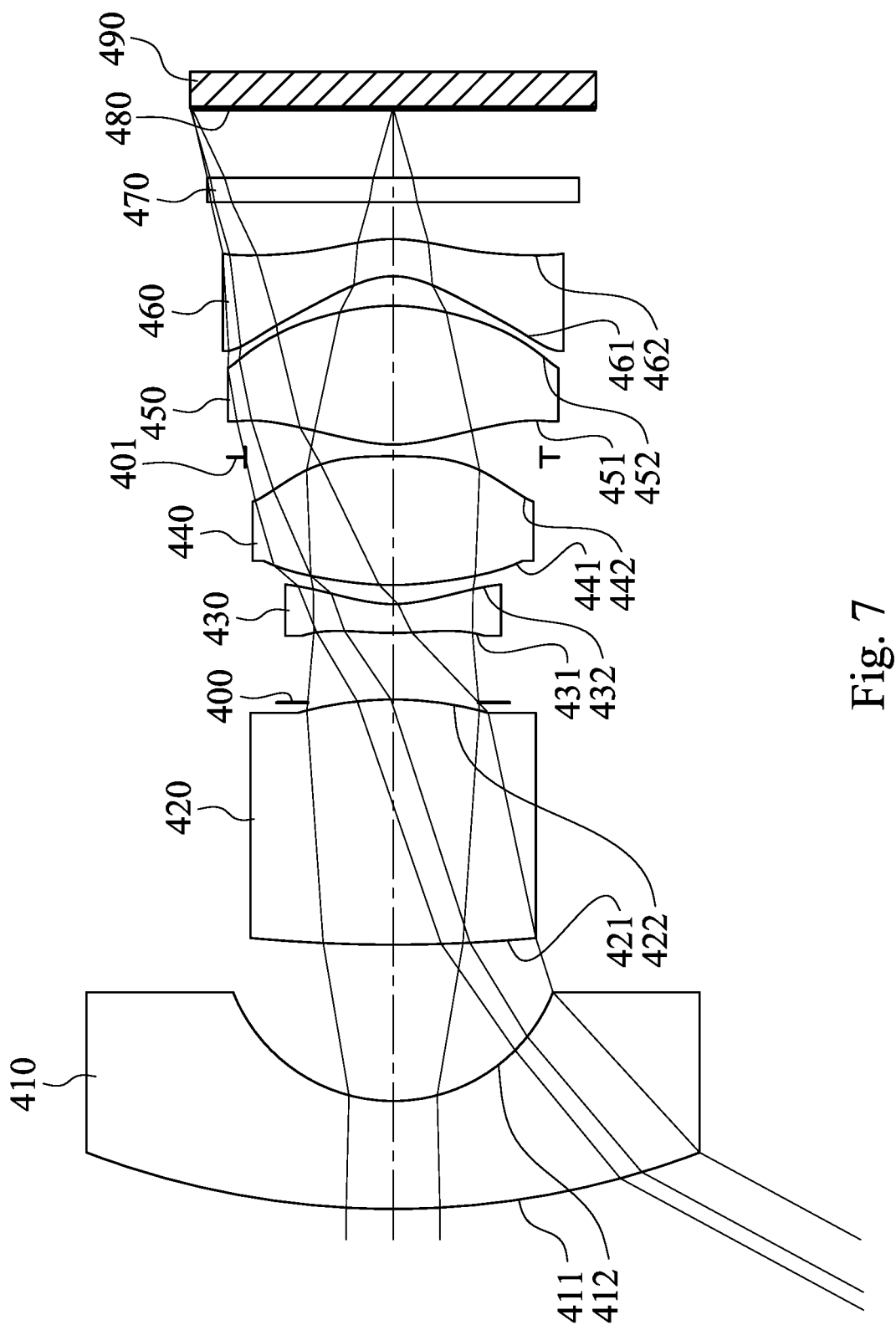
FIG. 7 is a schematic view of an imaging apparatus according to the 4th embodiment of the present disclosure.
Figure 8:
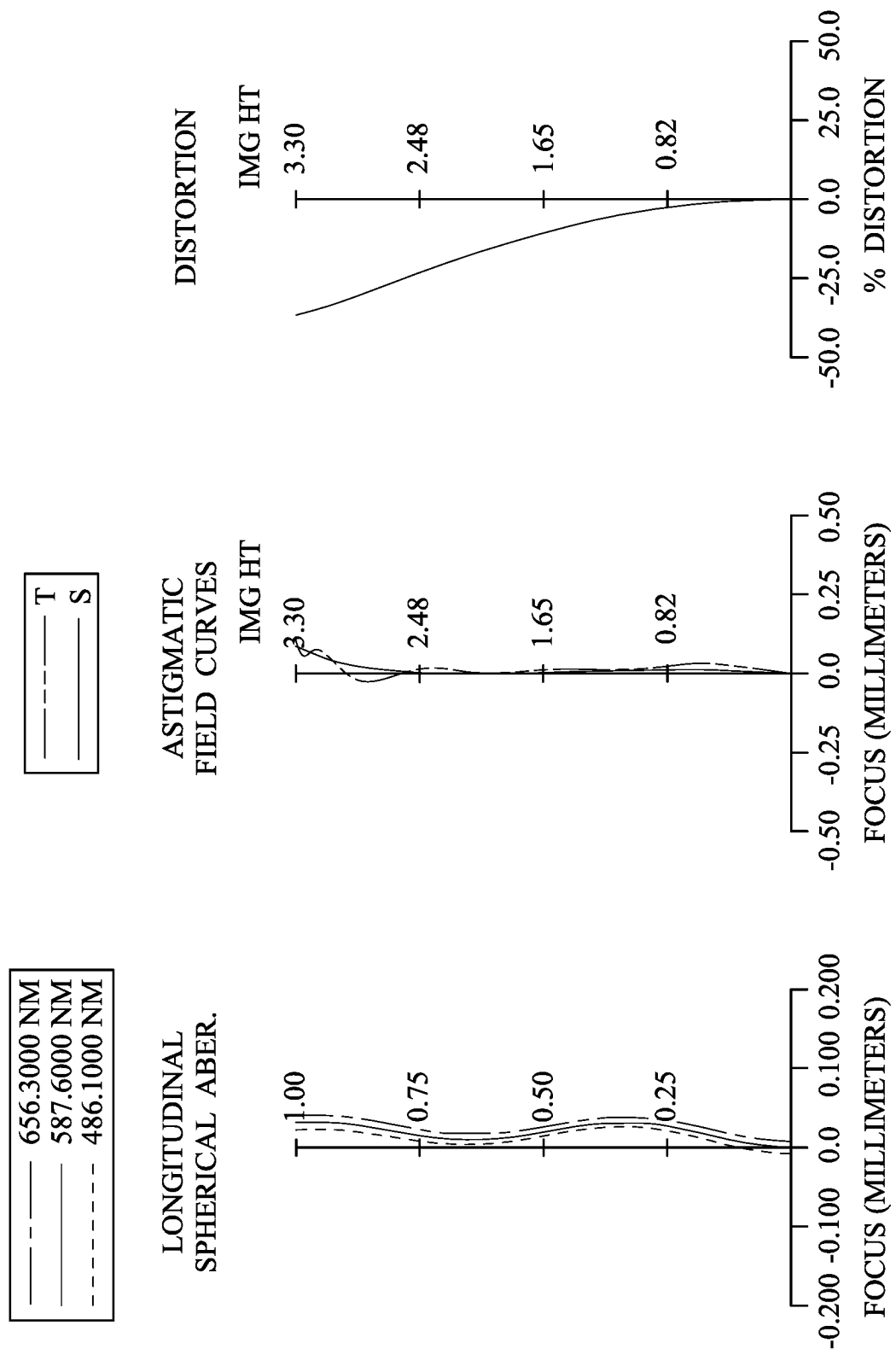
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an imaging lens assembly (its reference numeral is omitted) and an image sensor 490. The imaging lens assembly includes, in order from an object side to an image side, a first lens element 410, a second lens element 420, an aperture stop 400, a third lens element 430, a fourth lens element 440, a stop 401, a fifth lens element 450, a sixth lens element 460, a filter 470 and an image surface 480, wherein the image sensor 490 is disposed on the image surface 480 of the imaging lens assembly. The imaging lens assembly includes six lens elements (410, 420, 430, 440, 450, 460) without additional one or more lens elements inserted between the first lens element 410 and the sixth lens element 460, and each of the first lens element 410, the second lens element 420, the third lens element 430, the fourth lens element 440, the fifth lens element 450 and the sixth lens element 460 is a single and non-cemented lens element.

The first lens element 410 with negative refractive power has an object-side surface 411 being convex in a paraxial region thereof and an image-side surface 412 being concave in a paraxial region thereof. The first lens element 410 is made of a glass material, and has the object-side surface 411 and the image-side surface 412 being both spherical.

The second lens element 420 with positive refractive power has an object-side surface 421 being convex in a paraxial region thereof and an image-side surface 422 being convex in a paraxial region thereof. The second lens element 420 is made of a glass material, and has the object-side surface 421 and the image-side surface 422 being both spherical.

The third lens element 430 with negative refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of a plastic material, and has the object-side surface 441 and the image-side surface 442 being both aspheric. Furthermore, the image-side surface 442 of the fourth lens element 440 includes at least one inflection point.

The fifth lens element 450 with positive refractive power has an object-side surface 451 being convex in a paraxial region thereof and an image-side surface 452 being convex in a paraxial region thereof. The fifth lens element 450 is made of a plastic material, and has the object-side surface 451 and the image-side surface 452 being both aspheric. Furthermore, the object-side surface 451 of the fifth lens element 450 includes a concave shape in an off-axis region thereof.

The sixth lens element 460 with negative refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point.

The filter 470 is made of a glass material and located between the sixth lens element 460 and the image surface 480, and will not affect the focal length of the imaging lens assembly.

The detailed optical data of the 4th embodiment are shown in Table 7 and the aspheric surface data are shown in Table 8 below.

TABLE 7

4th Embodiment
f = 2.82 mm, Fno = 1.85, HFOV = 61.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 14.007 | | 1.760 | Glass | 1.772 | 49.6 | −4.86 |
| 2 | | 2.801 | | 2.550 | | | | |
| 3 | Lens 2 | 24.550 | | 4.000 | Glass | 1.834 | 37.2 | 5.81 |
| 4 | | −5.584 | | −0.053 | | | | |
| 5 | Ape. Stop | Plano | | 1.138 | | | | |
| 6 | Lens 3 | 5.460 | ASP | 0.470 | Plastic | 1.639 | 23.5 | −5.62 |
| 7 | | 2.094 | ASP | 0.311 | | | | |
| 8 | Lens 4 | 5.001 | ASP | 2.101 | Plastic | 1.534 | 55.9 | 8.39 |
| 9 | | −36.777 | ASP | −0.014 | | | | |
| 10 | Stop | Plano | | 0.206 | | | | |
| 11 | Lens 5 | 2.298 | ASP | 2.263 | Plastic | 1.534 | 55.9 | 2.96 |
| 12 | | −3.316 | ASP | 0.482 | | | | |
| 13 | Lens 6 | −1.245 | ASP | 0.606 | Plastic | 1.639 | 23.5 | −4.56 |
| 14 | | −2.587 | ASP | 0.600 | | | | |
| 15 | Filter | Plano | | 0.400 | Glass | 1.517 | 64.2 | — |
| 16 | | Plano | | 1.128 | | | | |
| 17 | Image | Plano | | — | | | | |

Reference wavelength is 587.6 nm (d-line).
Effective radius of stop on surface 10 is 2.410 mm.

TABLE 8

Aspheric Coefficients

| | Surface # | | | |
|---|---|---|---|---|
| | 6 | 7 | 8 | 9 |
| k = | −2.1024E+01 | −5.5240E−01 | −4.2611E+01 | 3.9960E+01 |
| A4 = | −6.0809E−02 | −9.5820E−02 | 3.2234E−02 | −1.0859E−01 |
| A6 = | 1.6034E−02 | 2.6403E−02 | −2.8665E−02 | 6.2032E−02 |
| A8 = | −2.6448E−03 | −4.7762E−03 | 1.3430E−02 | −2.8878E−02 |
| A10 = | −5.6392E−04 | 3.0600E−04 | −3.1344E−03 | 8.9475E−03 |
| A12 = | 9.7168E−05 | −5.3315E−06 | 3.6899E−04 | −1.7027E−03 |
| A14 = | | | −1.7554E−05 | 1.8222E−04 |
| A16 = | | | | −8.2765E−06 |

TABLE 8-continued

Aspheric Coefficients

| Surface # | | | |
|---|---|---|---|
| 11 | 12 | 13 | 14 |
| k = −8.2606E+00 | 2.5939E−01 | −1.7541E+00 | −3.2281E+00 |
| A4 = −2.4969E−02 | 2.2206E−02 | 6.6251E−02 | 5.2062E−02 |
| A6 = 1.6596E−02 | −5.5612E−03 | −2.7509E−02 | −1.4497E−02 |
| A8 = −7.3253E−03 | 1.2170E−03 | 8.2062E−03 | 3.1795E−03 |
| A10 = 1.7529E−03 | −1.8407E−04 | −1.6396E−03 | −5.4075E−04 |
| A12 = −2.1227E−04 | 1.2446E−05 | 1.7639E−04 | 5.7339E−05 |
| A14 = 1.0077E−05 | | −7.4139E−06 | −2.9988E−06 |
| A16 = | | | 5.2538E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.82 | (R7 + R8)/(R7 − R8) | −0.76 |
| Fno | 1.85 | CT6/T56 | 1.26 |
| HFOV [deg.] | 61.5 | f/TL | 0.16 |
| 1/|tan(HFOV)| | 0.54 | f5/CT2 | 0.74 |
| V3 | 23.5 | f5/T12 | 1.16 |
| V2 + V3 + V6 | 84.2 | f5/CT2 + f5/T12 | 1.90 |
| N1 + N2 | 3.606 | fG2/fG1 | 0.69 |
| (R3 − R4)/(R3 + R4) | 1.59 | BL/CT2 | 0.53 |
| (R4 + R5)/(R4 − R5) | 0.01 | (|P3| + |P4| + |P6|)/|P5| | 1.53 |
| (R5 + R6)/(R5 − R6) | 2.24 | |DsR5/DsR6| | 0.71 |
| (R4 + R6)/(R4 − R6) | 0.45 | | |

5th Embodiment

Figure 9:
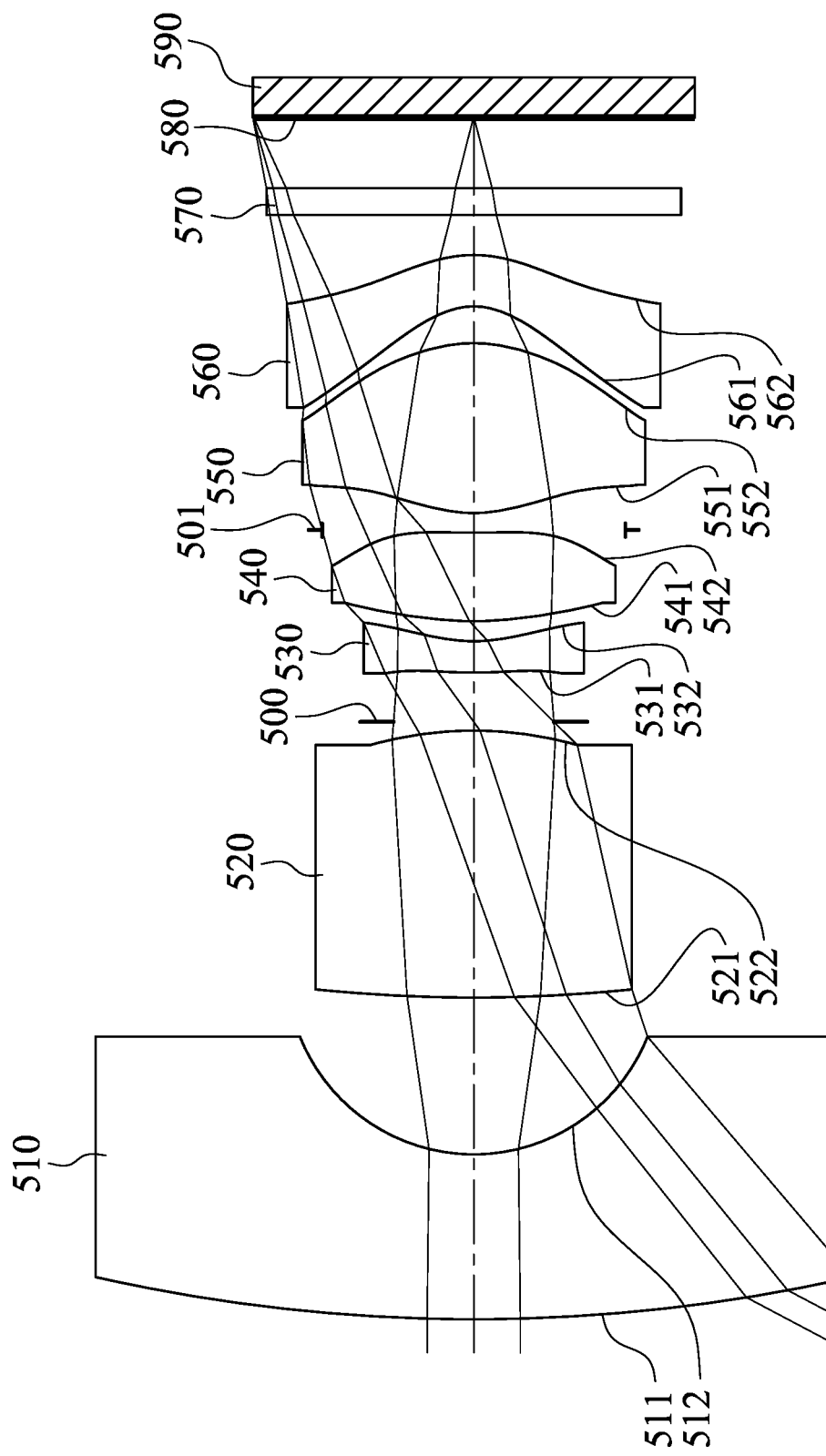
FIG. 9 is a schematic view of an imaging apparatus according to the 5th embodiment of the present disclosure.
Figure 10:
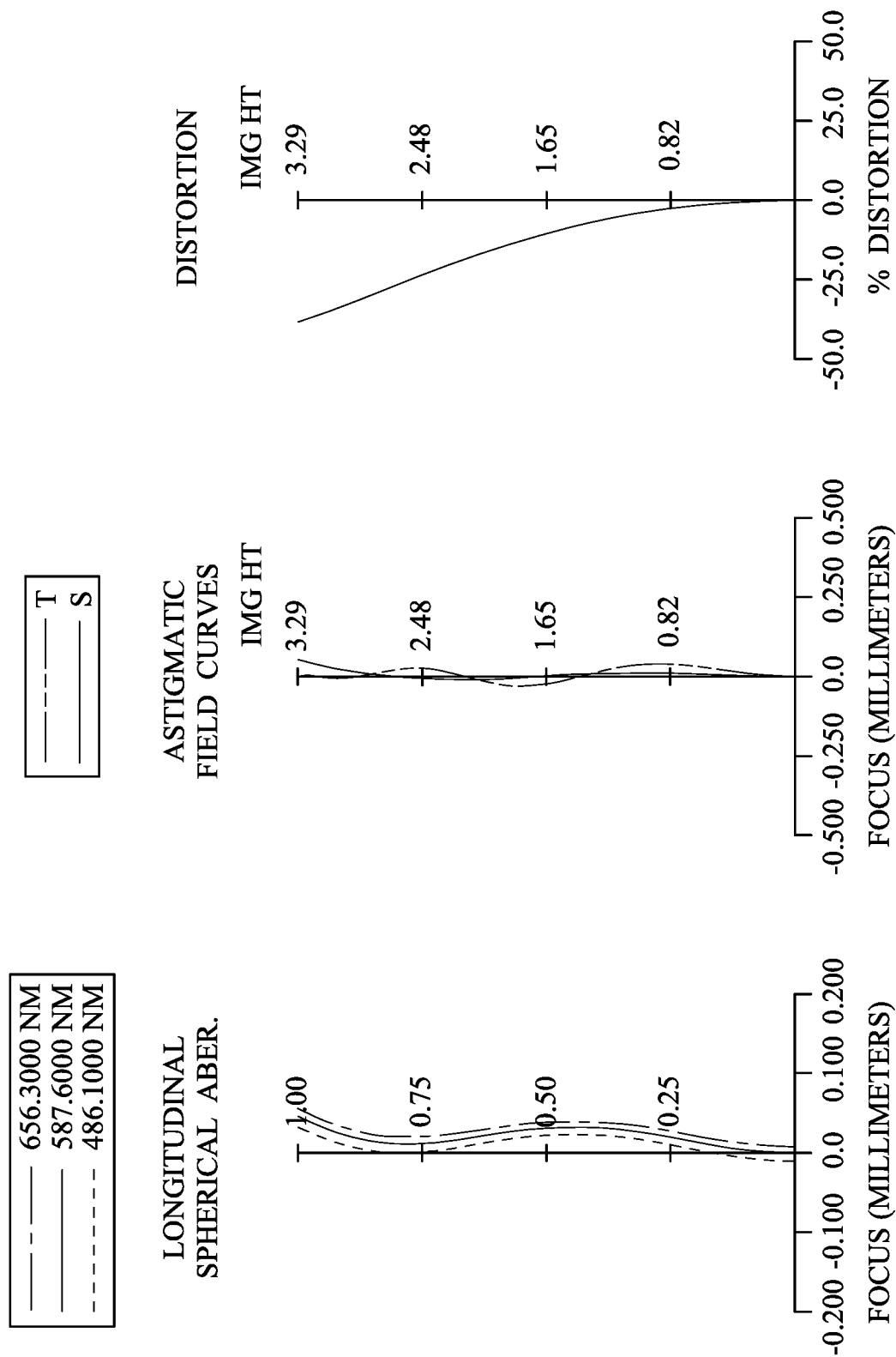
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an imaging lens assembly (its reference numeral is omitted) and an image sensor 590. The imaging lens assembly includes, in order from an object side to an image side, a first lens element 510, a second lens element 520, an aperture stop 500, a third lens element 530, a fourth lens element 540, a stop 501, a fifth lens element 550, a sixth lens element 560, a filter 570 and an image surface 580, wherein the image sensor 590 is disposed on the image surface 580 of the imaging lens assembly. The imaging lens assembly includes six lens elements (510, 520, 530, 540, 550, 560) without additional one or more lens elements inserted between the first lens element 510 and the sixth lens element 560, and each of the first lens element 510, the second lens element 520, the third lens element 530, the fourth lens element 540, the fifth lens element 550 and the sixth lens element 560 is a single and non-cemented lens element.

The first lens element 510 with negative refractive power has an object-side surface 511 being convex in a paraxial region thereof and an image-side surface 512 being concave in a paraxial region thereof. The first lens element 510 is made of a glass material, and has the object-side surface 511 and the image-side surface 512 being both spherical.

The second lens element 520 with positive refractive power has an object-side surface 521 being convex in a paraxial region thereof and an image-side surface 522 being convex in a paraxial region thereof. The second lens element 520 is made of a glass material, and has the object-side surface 521 and the image-side surface 522 being both spherical.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, each of the object-side surface 541 and the image-side surface 542 of the fourth lens element 540 includes at least one inflection point.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric. Furthermore, the object-side surface 551 of the fifth lens element 550 includes a concave shape in an off-axis region thereof.

The sixth lens element 560 with negative refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric. Furthermore, each of the object-side surface 561 and the image-side surface 562 of the sixth lens element 560 includes at least one inflection point.

The filter 570 is made of a glass material and located between the sixth lens element 560 and the image surface 580, and will not affect the focal length of the imaging lens assembly.

The detailed optical data of the 5th embodiment are shown in Table 9 and the aspheric surface data are shown in Table 10 below.

TABLE 9

5th Embodiment
f = 2.83 mm, Fno = 2.03, HFOV = 62.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 25.683 | | 2.470 | Glass | 1.639 | 55.5 | −5.14 |
| 2 | | 2.801 | | 2.350 | | | | |
| 3 | Lens 2 | 22.918 | | 4.000 | Glass | 1.834 | 37.2 | 5.80 |
| 4 | | −5.644 | | 0.131 | | | | |
| 5 | Ape. Stop | Plano | | 0.738 | | | | |
| 6 | Lens 3 | 6.475 | ASP | 0.470 | Plastic | 1.639 | 23.5 | −6.01 |
| 7 | | 2.343 | ASP | 0.300 | | | | |
| 8 | Lens 4 | 5.134 | ASP | 1.326 | Plastic | 1.534 | 55.9 | 18.24 |
| 9 | | 9.881 | ASP | 0.039 | | | | |
| 10 | Stop | Plano | | 0.256 | | | | |
| 11 | Lens 5 | 2.124 | ASP | 2.544 | Plastic | 1.534 | 55.9 | 2.60 |
| 12 | | −2.331 | ASP | 0.552 | | | | |
| 13 | Lens 6 | −1.054 | ASP | 0.770 | Plastic | 1.639 | 23.5 | −5.56 |
| 14 | | −1.925 | ASP | 0.600 | | | | |
| 15 | Filter | Plano | | 0.400 | Glass | 1.517 | 64.2 | — |
| 16 | | Plano | | 1.059 | | | | |
| 17 | Image | Plano | | — | | | | |

Reference wavelength is 587.6 nm (d-line).
Effective radius of stop on surface 10 is 2.270 mm.

TABLE 10

Aspheric Coefficients

| | Surface # | | | |
|---|---|---|---|---|
| | 6 | 7 | 8 | 9 |
| k = | −1.6443E+01 | −3.7356E−01 | −3.8602E+01 | 2.2359E+00 |
| A4 = | −6.0569E−02 | −8.6654E−02 | 2.0839E−02 | −8.8732E−02 |
| A6 = | 1.6003E−02 | 2.5668E−02 | −1.8697E−02 | 3.0297E−02 |
| A8 = | 2.8702E−04 | −3.5565E−03 | 8.6579E−03 | −9.6560E−03 |
| A10 = | −3.1902E−03 | −5.7862E−04 | −1.7691E−03 | 1.7338E−03 |
| A12 = | 6.4821E−04 | 1.1955E−04 | 1.3064E−04 | −1.1291E−04 |

| | Surface # | | | |
|---|---|---|---|---|
| | 11 | 12 | 13 | 14 |
| k = | −4.9629E+00 | −3.9151E−01 | −1.5615E+00 | −1.0903E+00 |
| A4 = | −2.1791E−02 | 2.5579E−02 | 2.7353E−02 | 3.8142E−02 |
| A6 = | 7.9416E−03 | −8.0374E−03 | −6.5010E−03 | −2.3673E−03 |
| A8 = | −2.9740E−03 | 2.0204E−03 | 1.4782E−03 | −6.9010E−05 |
| A10 = | 4.8207E−04 | −2.4443E−04 | −2.0540E−04 | 4.8960E−06 |
| A12 = | −2.5950E−05 | 1.3797E−05 | 1.1479E−05 | 5.4946E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.83 | (R7 + R8)/(R7 − R8) | −3.16 |
| Fno | 2.03 | CT6/T56 | 1.39 |
| HFOV [deg.] | 62.1 | f/TL | 0.16 |
| 1/|tan(HFOV)| | 0.53 | f5/CT2 | 0.65 |
| V3 | 23.5 | f5/T12 | 1.11 |
| V2 + V3 + V6 | 84.2 | f5/CT2 + f5/T12 | 1.76 |

-continued

| 5th Embodiment | | | |
|---|---|---|---|
| N1 + N2 | 3.473 | fG2/fG1 | 0.62 |
| (R3 − R4)/(R3 + R4) | 1.65 | BL/CT2 | 0.51 |
| (R4 + R5)/(R4 − R5) | −0.07 | (|P3| + |P4| + |P6|)/|P5| | 1.04 |
| (R5 + R6)/(R5 − R6) | 2.13 | |DsR5/DsR6| | 0.61 |
| (R4 + R6)/(R4 − R6) | 0.41 | | |

6th Embodiment

Figure 11:
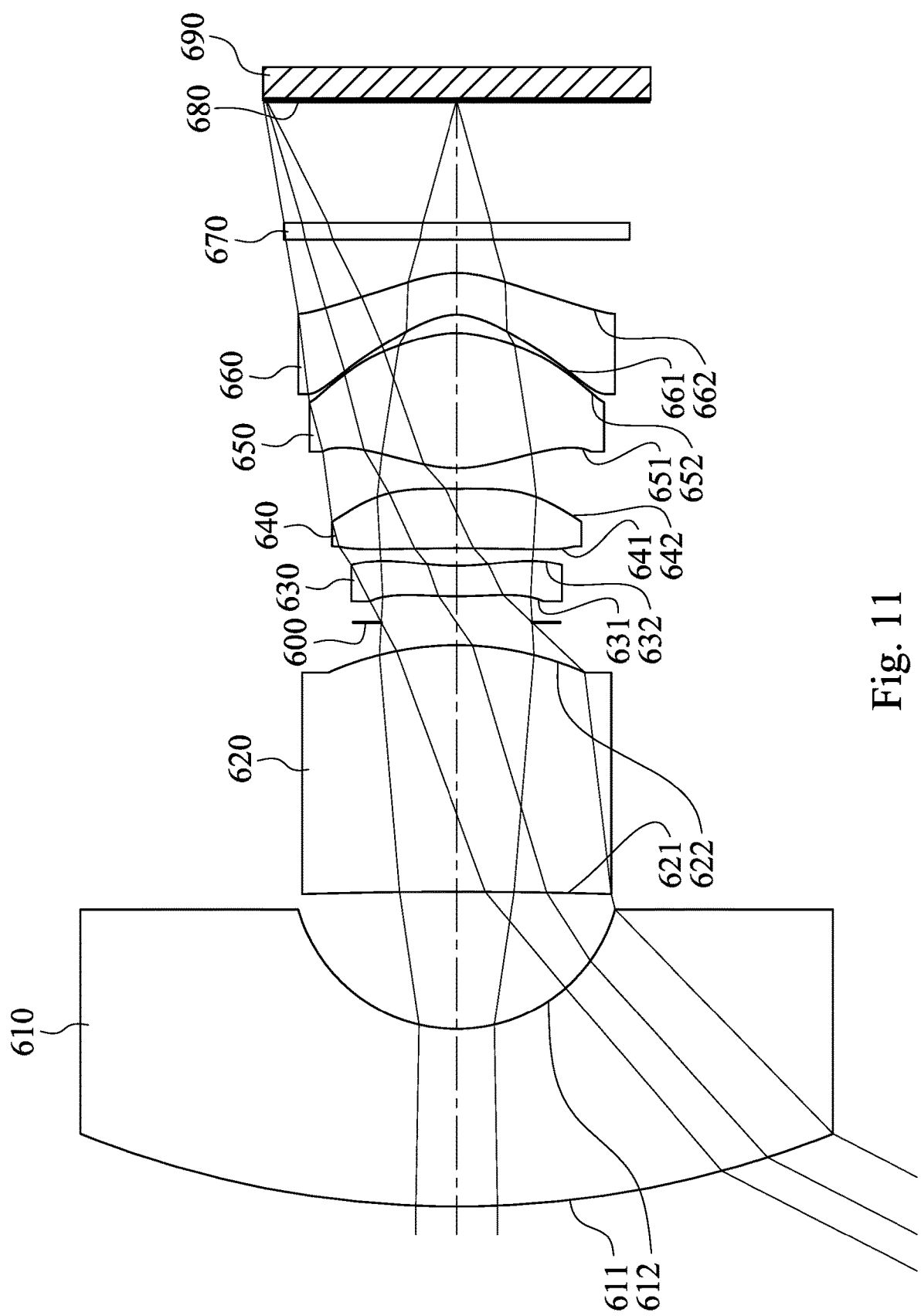
FIG. 11 is a schematic view of an imaging apparatus according to the 6th embodiment of the present disclosure.
Figure 12:
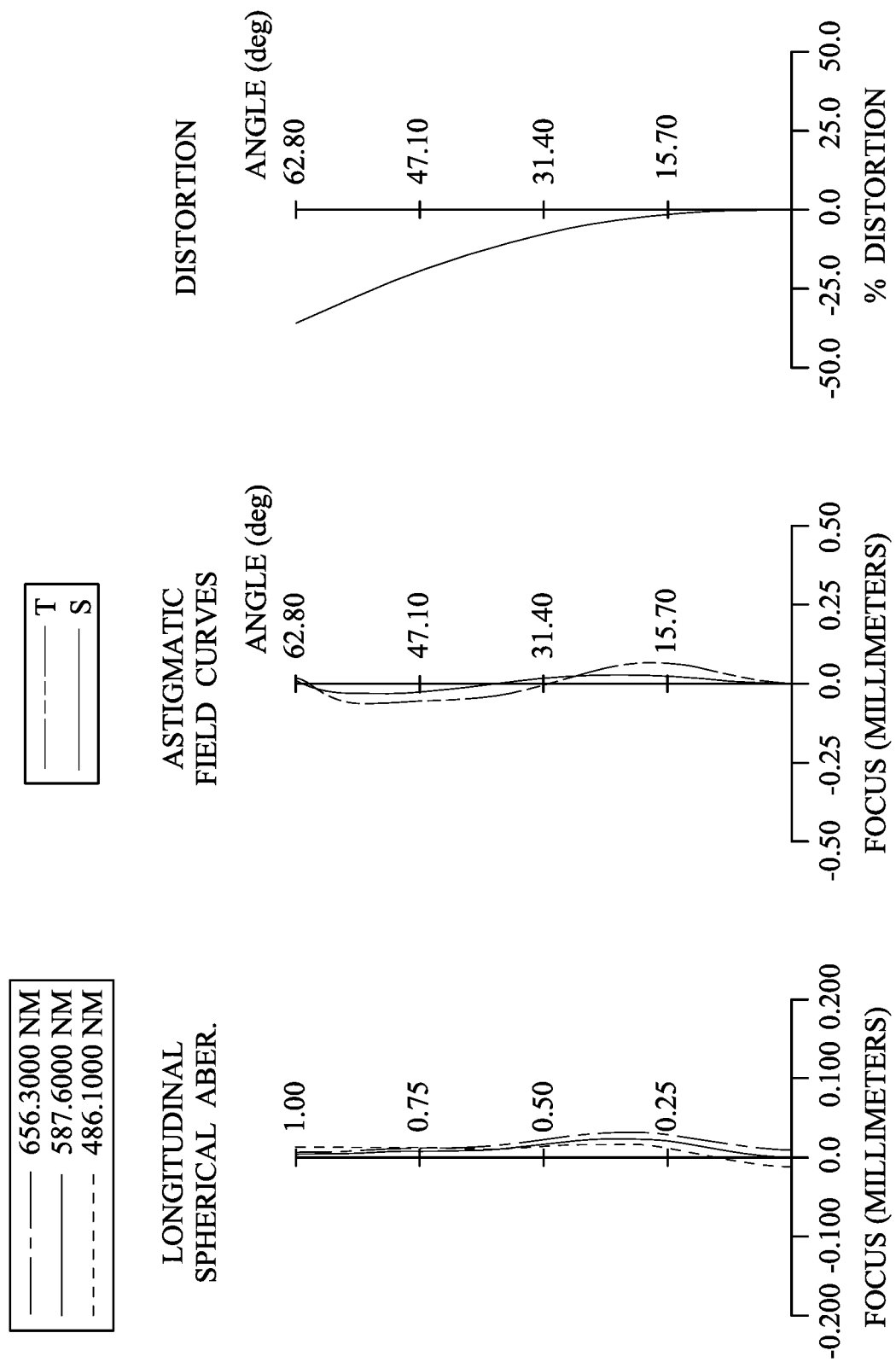
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an imaging lens assembly (its reference numeral is omitted) and an image sensor 690. The imaging lens assembly includes, in order from an object side to an image side, a first lens element 610, a second lens element 620, an aperture stop 600, a third lens element 630, a fourth lens element 640, a fifth lens element 650, a sixth lens element 660, a filter 670 and an image surface 680, wherein the image sensor 690 is disposed on the image surface 680 of the imaging lens assembly. The imaging lens assembly includes six lens elements (610, 620, 630, 640, 650, 660) without additional one or more lens elements inserted between the first lens element 610 and the sixth lens element 660, and each of the first lens element 610, the second lens element 620, the third lens element 630, the fourth lens element 640, the fifth lens element 650 and the sixth lens element 660 is a single and non-cemented lens element.

The first lens element 610 with negative refractive power has an object-side surface 611 being convex in a paraxial region thereof and an image-side surface 612 being concave in a paraxial region thereof. The first lens element 610 is made of a glass material, and has the object-side surface 611 and the image-side surface 612 being both spherical.

The second lens element 620 with positive refractive power has an object-side surface 621 being concave in a paraxial region thereof and an image-side surface 622 being convex in a paraxial region thereof. The second lens element 620 is made of a glass material, and has the object-side surface 621 and the image-side surface 622 being both spherical.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of a plastic material, and has the object-side surface 641 and the image-side surface 642 being both aspheric. Furthermore, each of the object-side surface 641 and the image-side surface 642 of the fourth lens element 640 includes at least one inflection point.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric. Furthermore, the object-side surface 651 of the fifth lens element 650 includes a concave shape in an off-axis region thereof.

The sixth lens element 660 with negative refractive power has an object-side surface 661 being concave in a paraxial region thereof and an image-side surface 662 being convex in a paraxial region thereof. The sixth lens element 660 is made of a plastic material, and has the object-side surface 661 and the image-side surface 662 being both aspheric. Furthermore, each of the object-side surface 661 and the image-side surface 662 of the sixth lens element 660 includes at least one inflection point.

The filter 670 is made of a glass material and located between the sixth lens element 660 and the image surface 680, and will not affect the focal length of the imaging lens assembly.

The detailed optical data of the 6th embodiment are shown in Table 11 and the aspheric surface data are shown in Table 12 below.

TABLE 11

6th Embodiment
f = 2.75 mm, Fno = 1.87, HFOV = 62.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 18.194 | | 3.192 | Glass | 1.729 | 54.7 | −5.32 |
| 2 | | 2.961 | | 2.473 | | | | |
| 3 | Lens 2 | −94.426 | | 4.444 | Glass | 1.834 | 37.3 | 7.03 |
| 4 | | −5.638 | | 0.409 | | | | |
| 5 | Ape. Stop | Plano | | 0.472 | | | | |
| 6 | Lens 3 | 8.676 | ASP | 0.550 | Plastic | 1.660 | 20.4 | −17.01 |
| 7 | | 4.771 | ASP | 0.321 | | | | |
| 8 | Lens 4 | −28.996 | ASP | 1.068 | Plastic | 1.511 | 56.8 | −20.92 |
| 9 | | 17.139 | ASP | 0.371 | | | | |
| 10 | Lens 5 | 2.281 | ASP | 2.432 | Plastic | 1.544 | 56.0 | 2.47 |
| 11 | | −2.049 | ASP | 0.336 | | | | |
| 12 | Lens 6 | −1.046 | ASP | 0.748 | Plastic | 1.660 | 20.4 | −5.24 |
| 13 | | −1.927 | ASP | 0.600 | | | | |
| 14 | Filter | Plano | | 0.300 | Glass | 1.517 | 64.2 | — |
| 15 | | Plano | | 2.214 | | | | |
| 16 | Image | Plano | | — | | | | |

Reference wavelength is 587.6 nm (d-line).

TABLE 12

Aspheric Coefficients

| | Surface # | | | |
|---|---|---|---|---|
| | 6 | 7 | 8 | 9 |
| k = | −5.3578E+01 | 8.7986E−01 | −5.5653E+01 | 2.4716E+01 |
| A4 = | −2.7514E−02 | −3.5651E−02 | 5.1910E−03 | −9.2004E−02 |
| A6 = | −1.1174E−03 | 4.3575E−03 | −6.2241E−04 | 3.8694E−02 |
| A8 = | −5.3680E−05 | −3.1586E−03 | −1.3556E−03 | −1.4055E−02 |

TABLE 12-continued

| Aspheric Coefficients | | | | |
|---|---|---|---|---|
| A10 = | −1.7901E−04 | 1.2947E−03 | 8.5966E−04 | 3.3069E−03 |
| A12 = | | −2.3496E−04 | −1.6585E−04 | −4.2181E−04 |
| A14 = | | 1.5078E−05 | 1.0814E−05 | 2.2388E−05 |

| Surface # | | | | |
|---|---|---|---|---|
| | 10 | 11 | 12 | 13 |
| k = | −7.2996E+00 | −6.8914E−01 | −2.4020E+00 | −2.4975E+00 |
| A4 = | −8.4347E−03 | 6.3690E−02 | 4.2054E−02 | 4.9912E−02 |
| A6 = | −3.1726E−04 | −2.5674E−02 | −2.5213E−02 | −1.8346E−02 |
| A8 = | 2.6315E−04 | 7.4080E−03 | 8.5131E−03 | 4.6670E−03 |
| A10 = | −1.1955E−04 | −1.5267E−03 | −1.8585E−03 | −8.0105E−04 |
| A12 = | 2.3468E−05 | 2.0810E−04 | 2.3941E−04 | 8.3983E−05 |
| A14 = | −1.9297E−06 | −1.6326E−05 | −1.5736E−05 | −4.6978E−06 |
| A16 = | | 5.7048E−07 | 4.0790E−07 | 1.0698E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.75 | (R7 + R8)/(R7 − R8) | 0.26 |
| Fno | 1.87 | CT6/T56 | 2.23 |
| HFOV [deg.] | 62.8 | f/TL | 0.14 |
| 1/|tan(HFOV)| | 0.51 | f5/CT2 | 0.56 |
| V3 | 20.4 | f5/T12 | 1.00 |
| V2 + V3 + V6 | 78.1 | f5/CT2 + f5/T12 | 1.56 |
| N1 + N2 | 3.563 | fG2/fG1 | 0.43 |
| (R3 − R4)/(R3 + R4) | 0.89 | BL/CT2 | 0.70 |
| (R4 + R5)/(R4 − R5) | −0.21 | (|P3| + |P4| + |P6|)/|P5| | 0.74 |
| (R5 + R6)/(R5 − R6) | 3.44 | |DsR5/DsR6| | 0.46 |
| (R4 + R6)/(R4 − R6) | 0.08 | | |

7th Embodiment

Figure 13:
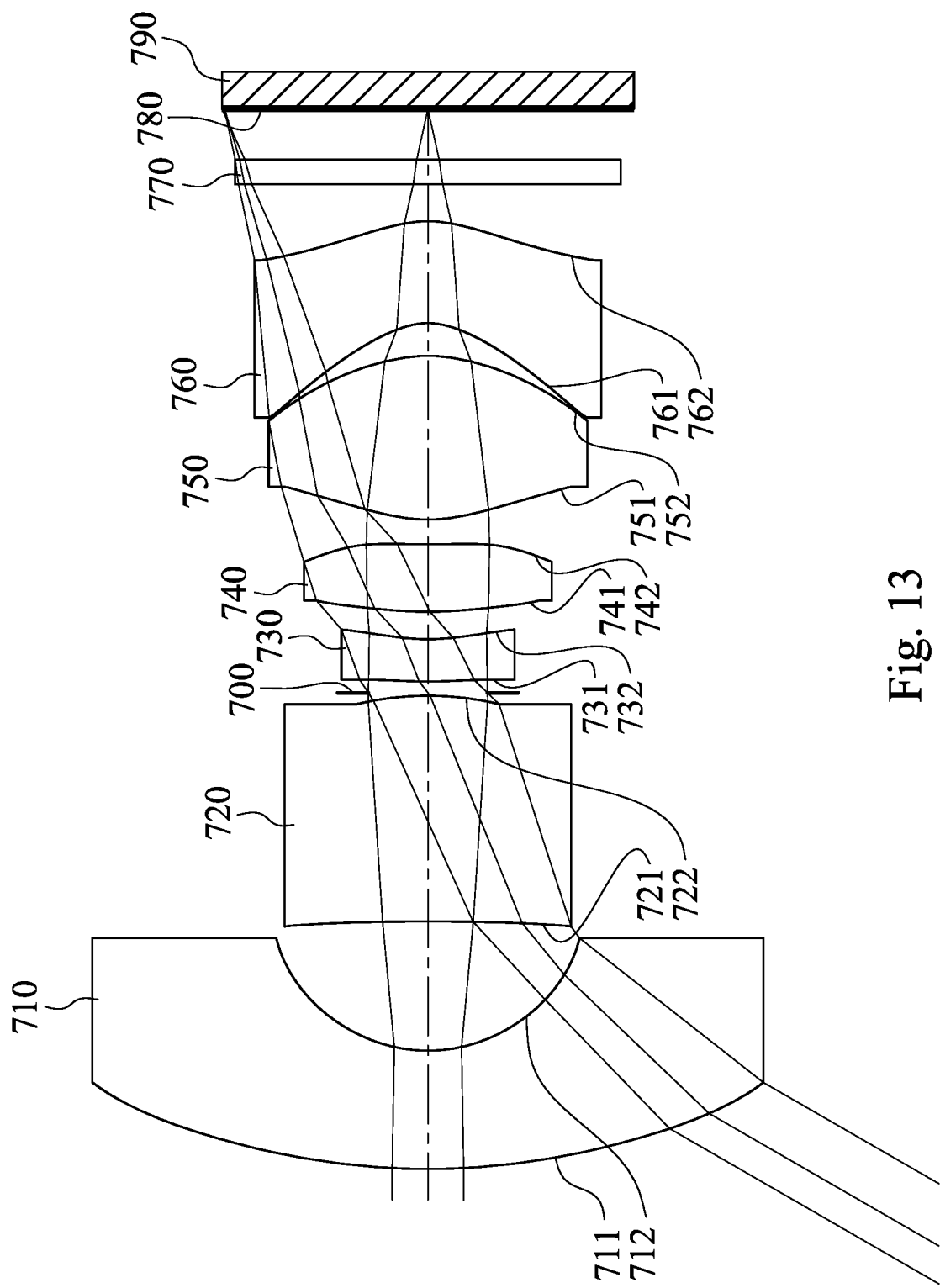
FIG. 13 is a schematic view of an imaging apparatus according to the 7th embodiment of the present disclosure.
Figure 14:
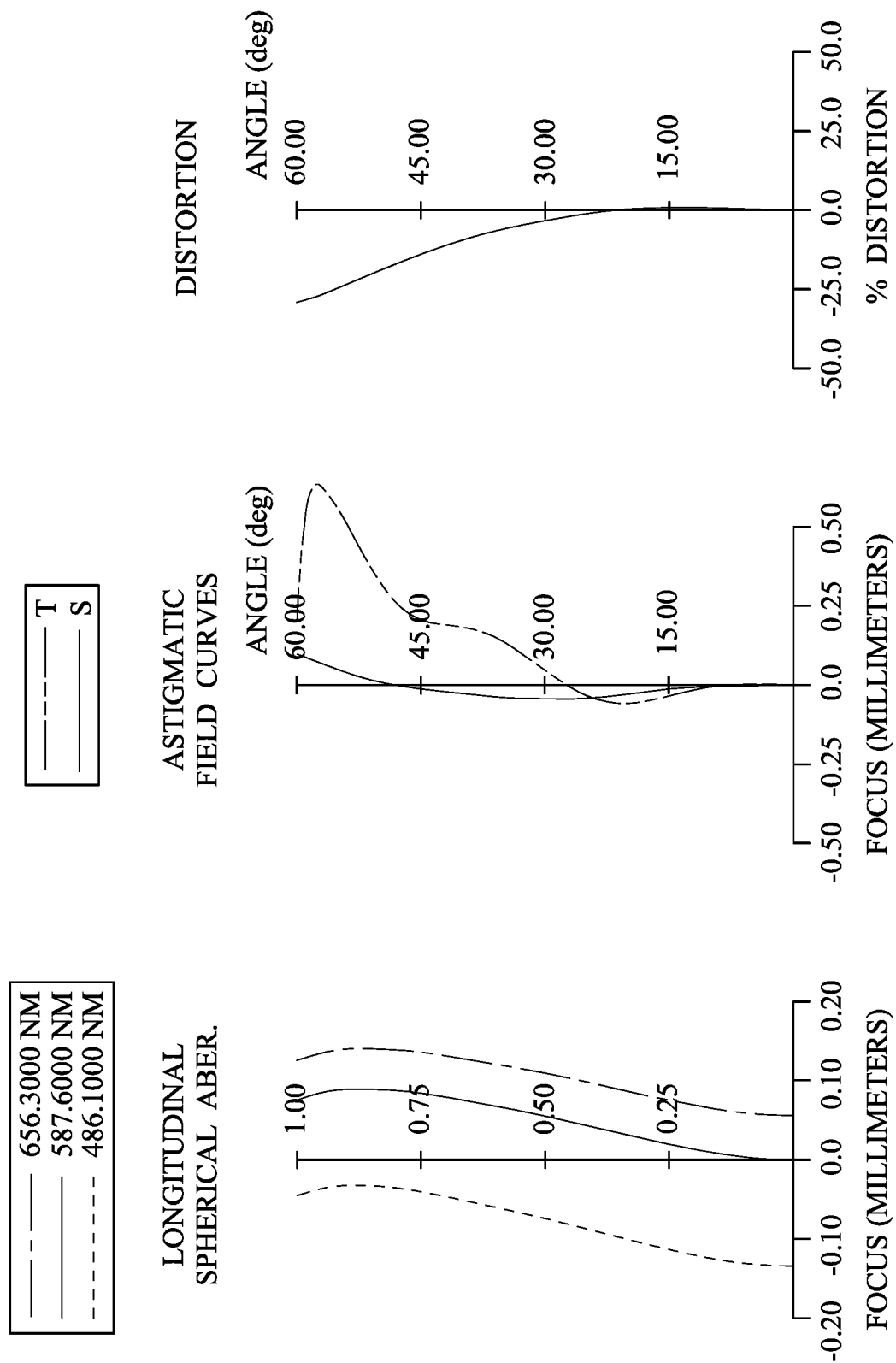
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an imaging lens assembly (its reference numeral is omitted) and an image sensor 790. The imaging lens assembly includes, in order from an object side to an image side, a first lens element 710, a second lens element 720, an aperture stop 700, a third lens element 730, a fourth lens element 740, a fifth lens element 750, a sixth lens element 760, a filter 770 and an image surface 780, wherein the image sensor 790 is disposed on the image surface 780 of the imaging lens assembly. The imaging lens assembly includes six lens elements (710, 720, 730, 740, 750, 760) without additional one or more lens elements inserted between the first lens element 710 and the sixth lens element 760, and each of the first lens element 710, the second lens element 720, the third lens element 730, the fourth lens element 740, the fifth lens element 750 and the sixth lens element 760 is a single and non-cemented lens element.

The first lens element 710 with negative refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of a plastic material, and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, the image-side surface 742 of the fourth lens element 740 includes at least one inflection point.

The fifth lens element 750 with positive refractive power has an object-side surface 751 being convex in a paraxial region thereof and an image-side surface 752 being convex in a paraxial region thereof. The fifth lens element 750 is made of a plastic material, and has the object-side surface 751 and the image-side surface 752 being both aspheric. Furthermore, the object-side surface 751 of the fifth lens element 750 includes a concave shape in an off-axis region thereof.

The sixth lens element 760 with negative refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric. Furthermore, each of the object-side surface 761 and the image-side surface 762 of the sixth lens element 760 includes at least one inflection point.

The filter 770 is made of a glass material and located between the sixth lens element 760 and the image surface 780, and will not affect the focal length of the imaging lens assembly.

The detailed optical data of the 7th embodiment are shown in Table 13 and the aspheric surface data are shown in Table 14 below.

TABLE 13

7th Embodiment
f = 2.67 mm, Fno = 2.30, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.318 | ASP | 1.921 | Plastic | 1.545 | 56.0 | −6.45 |
| 2 | | 2.521 | ASP | 2.099 | | | | |
| 3 | Lens 2 | −32.385 | ASP | 3.661 | Plastic | 1.614 | 26.0 | 9.24 |
| 4 | | −5.033 | ASP | 0.046 | | | | |
| 5 | Ape. Stop | Plano | | 0.185 | | | | |
| 6 | Lens 3 | 8.196 | ASP | 0.686 | Plastic | 1.660 | 20.4 | −9.68 |
| 7 | | 3.471 | ASP | 0.444 | | | | |
| 8 | Lens 4 | 5.879 | ASP | 1.095 | Plastic | 1.534 | 55.9 | 21.30 |
| 9 | | 11.385 | ASP | 0.403 | | | | |
| 10 | Lens 5 | 2.591 | ASP | 2.657 | Plastic | 1.614 | 26.0 | 2.55 |
| 11 | | −2.410 | ASP | 0.531 | | | | |
| 12 | Lens 6 | −1.093 | ASP | 1.652 | Plastic | 1.559 | 40.4 | −14.14 |
| 13 | | −1.956 | ASP | 0.600 | | | | |
| 14 | Filter | Plano | | 0.400 | Glass | 1.517 | 64.2 | — |
| 15 | | Plano | | 0.827 | | | | |
| 16 | Image | Plano | | — | | | | |

Reference wavelength is 587.6 nm (d-line).

TABLE 14

Aspheric Coefficients

| | Surface # | | | | | |
|---|---|---|---|---|---|---|
| | 1 | 2 | 3 | 4 | 6 | 7 |
| k = | 1.0183E+00 | 5.7591E−03 | 5.0795E+01 | 7.4506E−01 | −2.6369E+01 | 1.9738E+00 |
| A4 = | −3.0922E−04 | −1.9798E−03 | 1.4769E−03 | 1.5252E−04 | −3.0602E−02 | −5.5974E−02 |
| A6 = | −1.6098E−06 | −1.0353E−04 | −1.4504E−04 | −1.3917E−04 | 2.7819E−03 | 1.0696E−02 |
| A8 = | 8.9513E−08 | −4.2122E−05 | −2.5422E−06 | −3.3958E−04 | −9.1288E−06 | −4.7925E−03 |
| A10 = | 6.0651E−09 | −1.3287E−06 | −2.4949E−06 | −3.5024E−04 | −2.1741E−04 | 2.0065E−03 |
| A12 = | | | | | | −4.9555E−04 |
| A14 = | | | | | | 3.7819E−05 |

| | Surface # | | | | | |
|---|---|---|---|---|---|---|
| | 8 | 9 | 10 | 11 | 12 | 13 |
| k = | −5.4009E+01 | 2.2771E+01 | −7.5273E+00 | −4.2779E−01 | −2.3217E+00 | −2.5633E+00 |
| A4 = | 4.9298E−03 | −6.6950E−02 | 8.3077E−03 | 5.0978E−02 | 6.0573E−02 | 5.6966E−02 |
| A6 = | −5.6101E−03 | 2.0337E−02 | −9.3158E−03 | −1.8010E−02 | −5.5597E−02 | −2.4332E−02 |
| A8 = | 1.1513E−03 | −6.7849E−03 | 3.5232E−03 | 2.8901E−03 | 2.3558E−02 | 6.8101E−03 |
| A10 = | 5.1666E−04 | 1.5563E−03 | −7.9571E−04 | 1.1174E−04 | −5.4959E−03 | −1.1454E−03 |
| A12 = | −1.7499E−04 | −1.7027E−04 | 1.1301E−04 | −8.5412E−05 | 7.1486E−04 | 1.0993E−04 |
| A14 = | 1.4025E−05 | 5.9987E−06 | −7.3605E−06 | 8.5415E−06 | −4.8666E−05 | −5.6134E−06 |
| A16 = | | | | −2.3600E−07 | 1.3770E−06 | 1.2567E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.67 | (R7 + R8)/(R7 − R8) | −3.14 |
| Fno | 2.30 | CT6/T56 | 3.11 |
| HFOV [deg.] | 60.0 | f/TL | 0.15 |
| 1/|tan(HFOV)| | 0.58 | f5/CT2 | 0.70 |
| V3 | 20.4 | f5/T12 | 1.21 |

-continued

| 7th Embodiment | | | |
|---|---|---|---|
| V2 + V3 + V6 | 86.8 | f5/CT2 + f5/T12 | 1.91 |
| N1 + N2 | 3.158 | fG2/fG1 | 0.11 |
| (R3 − R4)/(R3 + R4) | 0.73 | BL/CT2 | 0.50 |
| (R4 + R5)/(R4 − R5) | −0.24 | (|P3| + |P4| + |P6|)/|P5| | 0.56 |
| (R5 + R6)/(R5 − R6) | 2.47 | |DsR5/DsR6| | 0.21 |
| (R4 + R6)/(R4 − R6) | 0.18 | | |

8th Embodiment

Figure 15:
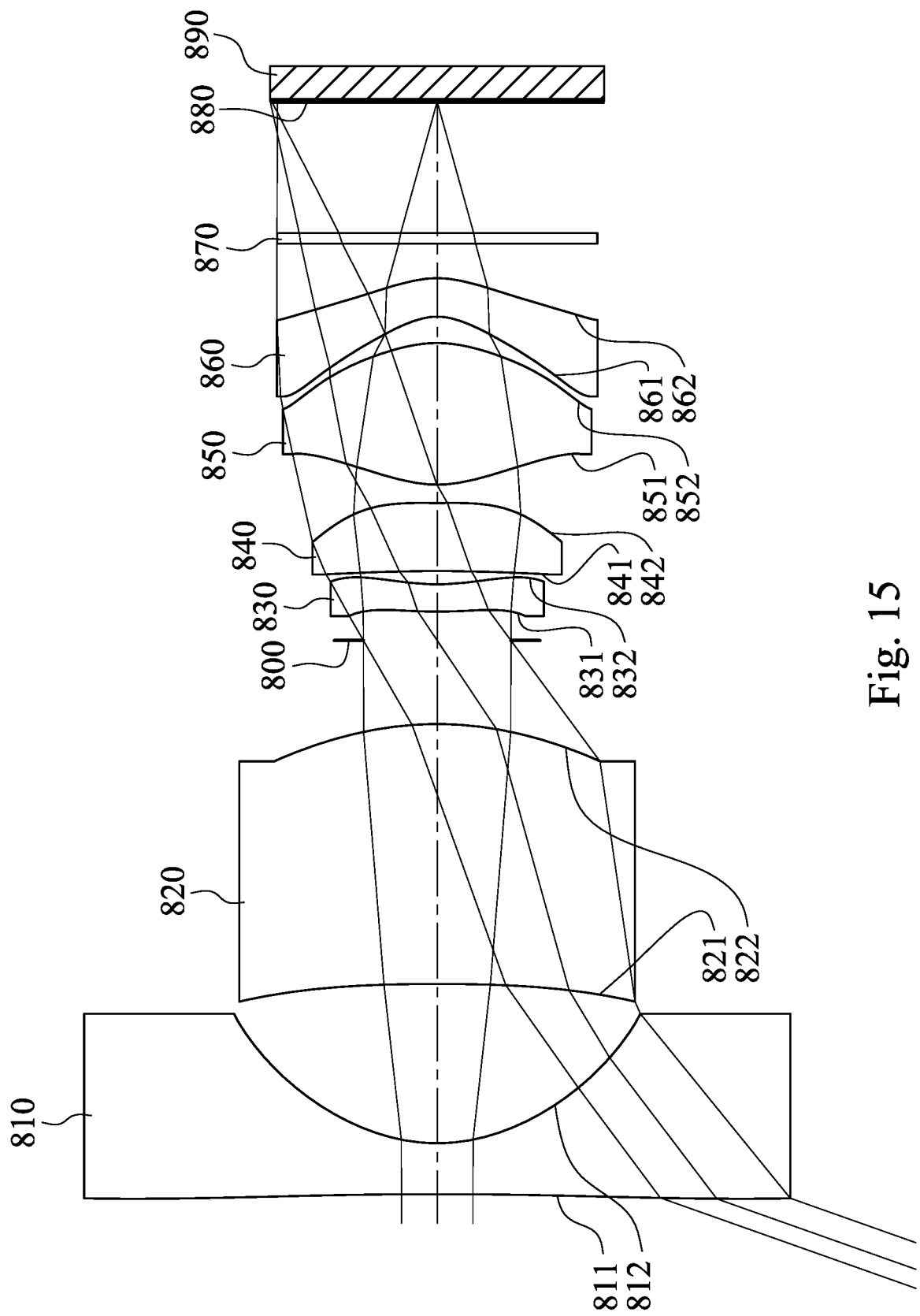
FIG. 15 is a schematic view of an imaging apparatus according to the 8th embodiment of the present disclosure.
Figure 16:
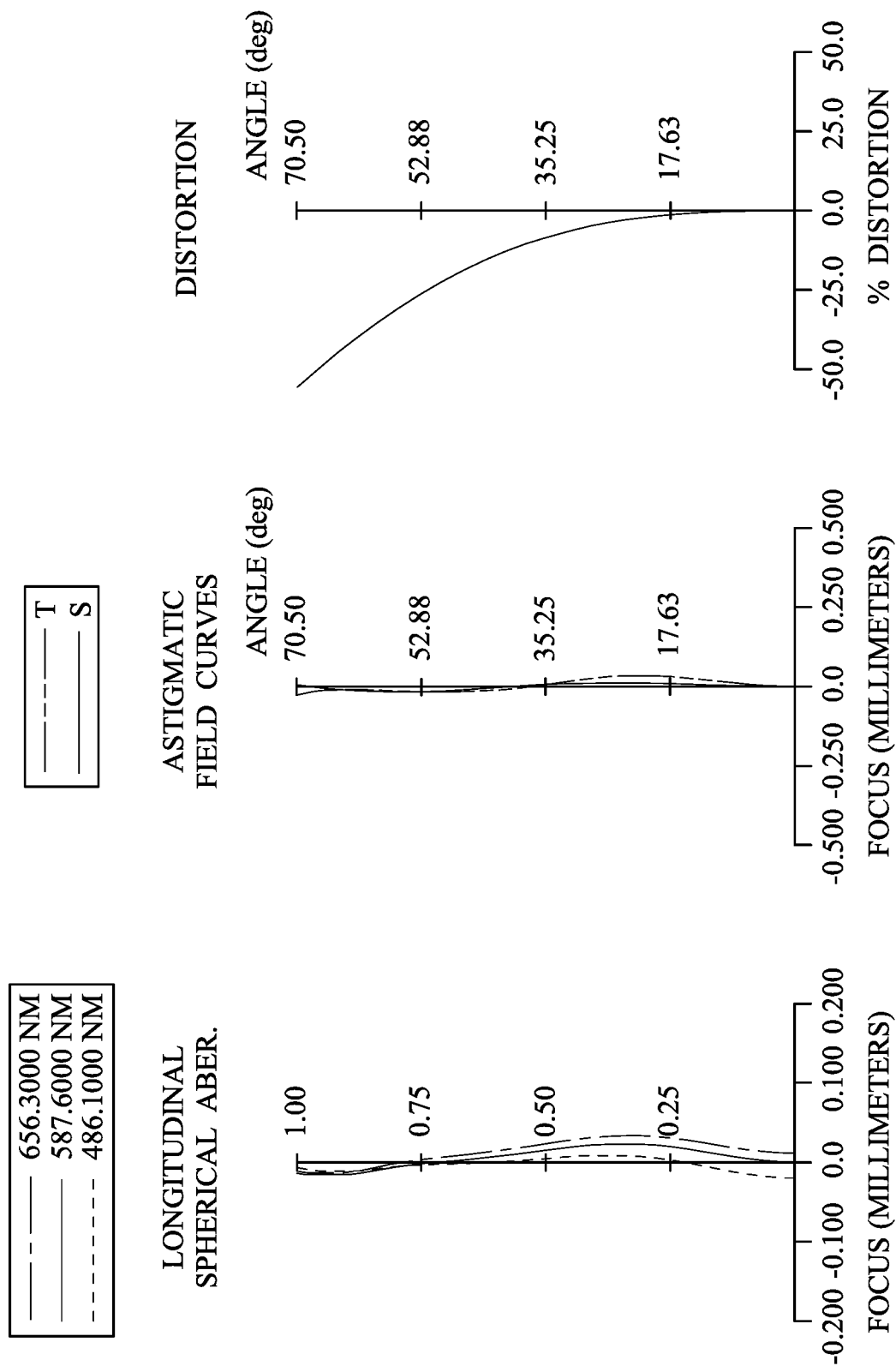
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an imaging lens assembly (its reference numeral is omitted) and an image sensor 890. The imaging lens assembly includes, in order from an object side to an image side, a first lens element 810, a second lens element 820, an aperture stop 800, a third lens element 830, a fourth lens element 840, a fifth lens element 850, a sixth lens element 860, a filter 870 and an image surface 880, wherein the image sensor 890 is disposed on the image surface 880 of the imaging lens assembly. The imaging lens assembly includes six lens elements (810, 820, 830, 840, 850, 860) without additional one or more lens elements inserted between the first lens element 810 and the sixth lens element 860, and each of the first lens element 810, the second lens element 820, the third lens element 830, the fourth lens element 840, the fifth lens element 850 and the sixth lens element 860 is a single and non-cemented lens element.

The first lens element 810 with negative refractive power has an object-side surface 811 being concave in a paraxial region thereof and an image-side surface 812 being concave in a paraxial region thereof. The first lens element 810 is made of a plastic material, and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with negative refractive power has an object-side surface 841 being concave in a paraxial region thereof and an image-side surface 842 being concave in a paraxial region thereof. The fourth lens element 840 is made of a plastic material, and has the object-side surface 841 and the image-side surface 842 being both aspheric. Furthermore, each of the object-side surface 841 and the image-side surface 842 of the fourth lens element 840 includes at least one inflection point.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric. Furthermore, the object-side surface 851 of the fifth lens element 850 includes a concave shape in an off-axis region thereof.

The sixth lens element 860 with negative refractive power has an object-side surface 861 being concave in a paraxial region thereof and an image-side surface 862 being convex in a paraxial region thereof. The sixth lens element 860 is made of a plastic material, and has the object-side surface 861 and the image-side surface 862 being both aspheric. Furthermore, each of the object-side surface 861 and the image-side surface 862 of the sixth lens element 860 includes at least one inflection point.

The filter 870 is made of a glass material and located between the sixth lens element 860 and the image surface 880, and will not affect the focal length of the imaging lens assembly.

The detailed optical data of the 8th embodiment are shown in Table 15 and the aspheric surface data are shown in Table 16 below.

TABLE 15

8th Embodiment f = 2.31 mm, Fno = 1.87, HFOV = 70.5 deg.

| Surface # |          | Curvature Radius |       | Thickness | Material | Index | Abbe # | Focal Length |
|-----------|----------|------------------|-------|-----------|----------|-------|--------|--------------|
| 0         | Object   | Plano            |       | Infinity  |          |       |        |              |
| 1         | Lens 1   | −88.317          | ASP   | 0.885     | Plastic  | 1.545 | 56.0   | −5.63        |
| 2         |          | 3.186            | ASP   | 2.756     |          |       |        |              |
| 3         | Lens 2   | −35.976          | ASP   | 4.500     | Plastic  | 1.614 | 26.0   | 10.92        |
| 4         |          | −5.919           | ASP   | 1.447     |          |       |        |              |
| 5         | Ape. Stop| Plano            |       | 0.499     |          |       |        |              |
| 6         | Lens 3   | 7.359            | ASP   | 0.474     | Plastic  | 1.660 | 20.4   | −14.06       |
| 7         |          | 3.999            | ASP   | 0.230     |          |       |        |              |
| 8         | Lens 4   | −26.075          | ASP   | 1.176     | Plastic  | 1.515 | 56.5   | −27.96       |
| 9         |          | 32.607           | ASP   | 0.319     |          |       |        |              |
| 10        | Lens 5   | 2.119            | ASP   | 2.452     | Plastic  | 1.544 | 55.9   | 2.44         |
| 11        |          | −2.109           | ASP   | 0.456     |          |       |        |              |
| 12        | Lens 6   | −1.031           | ASP   | 0.666     | Plastic  | 1.660 | 20.4   | −5.41        |
| 13        |          | −1.821           | ASP   | 0.600     |          |       |        |              |
| 14        | Filter   | Plano            |       | 0.180     | Glass    | 1.517 | 64.2   | —            |
| 15        |          | Plano            |       | 2.290     |          |       |        |              |
| 16        | Image    | Plano            |       | —         |          |       |        |              |

Reference wavelength is 587.6 nm (d-line).

TABLE 16

Aspheric Coefficients

| Surface # | | | | | | |
|---|---|---|---|---|---|---|
| | 1 | 2 | 3 | 4 | 6 | 7 |
| k = | −9.9000E+01 | −3.0206E−01 | 8.9950E+01 | −1.4762E+00 | −3.4173E+01 | 3.4535E−01 |
| A4 = | 8.8399E−05 | −2.6182E−03 | −1.4165E−03 | 3.2307E−04 | −2.8910E−02 | −3.7983E−02 |
| A6 = | −8.2338E−07 | 1.6469E−05 | 7.2793E−05 | −7.1821E−06 | −2.0125E−03 | 4.1891E−03 |
| A8 = | 2.1380E−08 | −8.0992E−06 | 3.2376E−08 | −2.1050E−06 | 1.3904E−04 | −3.1080E−03 |
| A10 = | | | | | −3.6435E−04 | 1.2705E−03 |
| A12 = | | | | | | −2.4425E−04 |
| A14 = | | | | | | 1.3975E−05 |

| Surface # | | | | | | |
|---|---|---|---|---|---|---|
| | 8 | 9 | 10 | 11 | 12 | 13 |
| k = | 9.9000E+01 | 2.3565E+01 | −6.4035E−00 | −6.9462E−01 | −2.5459E+00 | −2.9832E+00 |
| A4 = | 3.8028E−03 | −9.4634E−02 | −4.2511E−03 | 6.4179E−02 | 4.2165E−02 | 4.9776E−02 |
| A6 = | −3.9825E−04 | 3.8399E−02 | −2.4021E−04 | −2.5653E−02 | −2.5217E−02 | −1.8429E−02 |
| A8 = | −1.3814E−03 | −1.4008E−02 | 2.4956E−04 | 7.4073E−03 | 8.5122E−03 | 4.6579E−03 |
| A10 = | 8.5673E−04 | 3.3275E−03 | −1.2198E−04 | −1.5269E−03 | −1.8587E−03 | −8.0155E−04 |
| A12 = | −1.6585E−04 | −4.2193E−04 | 2.3853E−05 | 2.0808E−04 | 2.3940E−04 | 8.3993E−05 |
| A14 = | 8.7409E−06 | 2.1632E−05 | −1.7215E−06 | −1.6327E−05 | −1.5735E−05 | −4.6907E−06 |
| A16 = | | | | 5.7048E−07 | 4.0908E−07 | 1.0818E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.31 | (R7 + R8)/(R7 − R8) | −0.11 |
| Fno | 1.87 | CT6/T56 | 1.46 |
| HFOV [deg.] | 70.5 | f/TL | 0.12 |
| 1/|tan(HFOV)| | 0.35 | f5/CT2 | 0.54 |
| V3 | 20.4 | f5/T12 | 0.89 |
| V2 + V3 + V6 | 66.8 | f5/CT2 + f5/T12 | 1.43 |
| N1 + N2 | 3.158 | fG2/fG1 | 0.05 |
| (R3 − R4)/(R3 + R4) | 0.72 | BL/CT2 | 0.68 |
| (R4 + R5)/(R4 − R5) | −0.11 | (|P3| + |P4| + |P6|)/|P5| | 0.71 |
| (R5 + R6)/(R5 − R6) | 3.38 | |DsR5/DsR6| | 0.51 |
| (R4 + R6)/(R4 − R6) | 0.19 | | |

9th Embodiment

Figure 17:
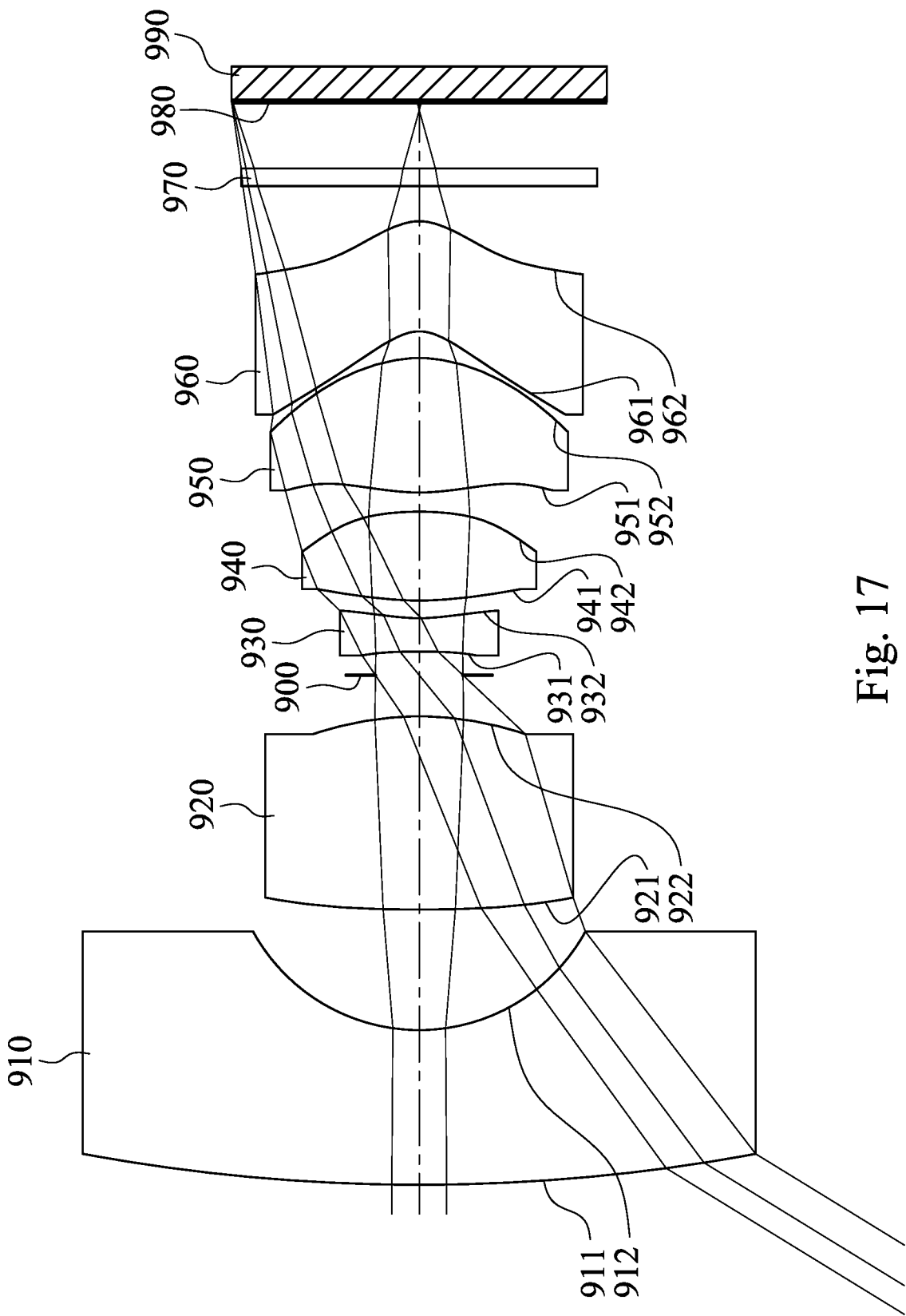
FIG. 17 is a schematic view of an imaging apparatus according to the 9th embodiment of the present disclosure.
Figure 18:
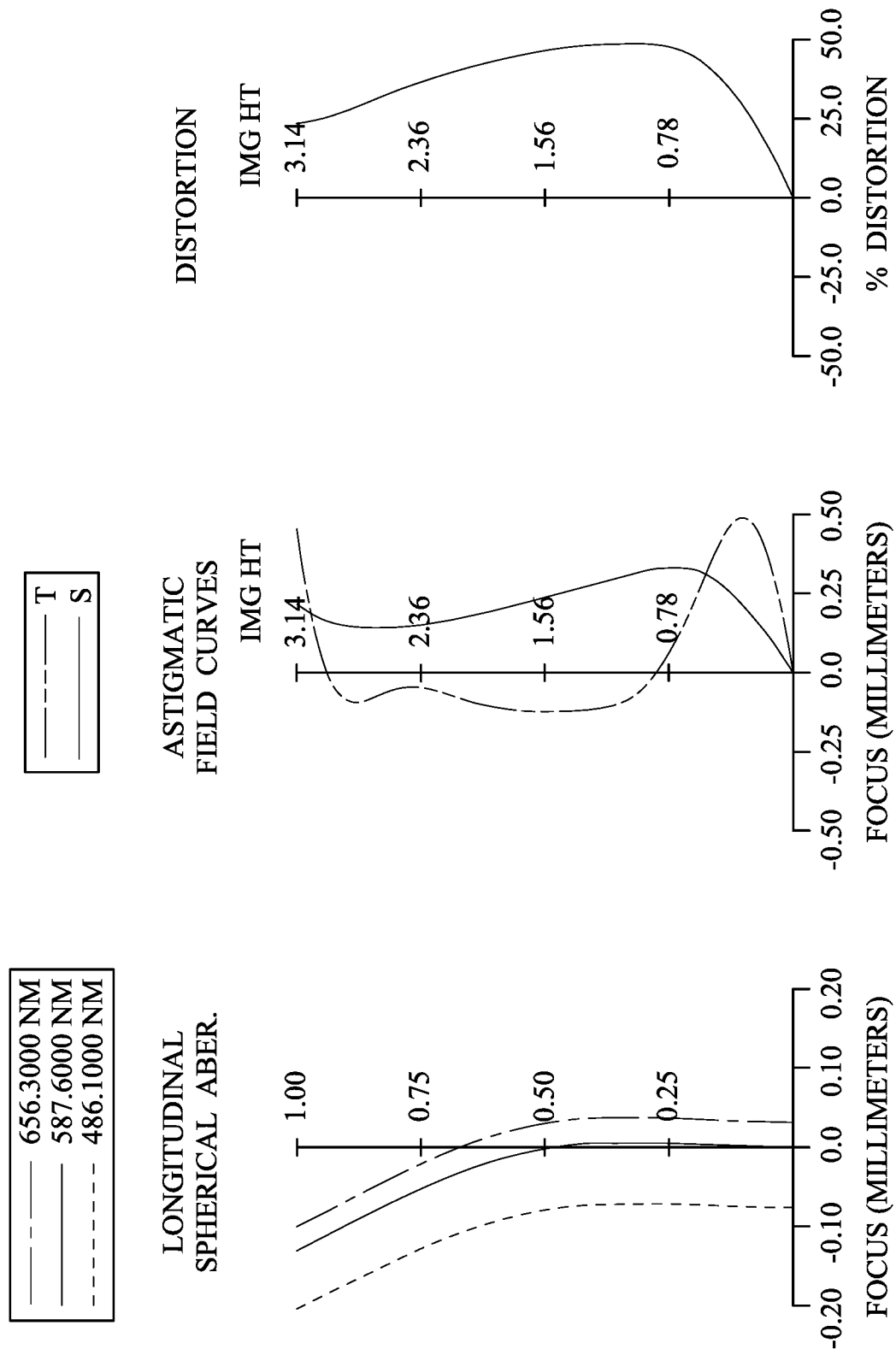
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an imaging lens assembly (its reference numeral is omitted) and an image sensor 990. The imaging lens assembly includes, in order from an object side to an image side, a first lens element 910, a second lens element 920, an aperture stop 900, a third lens element 930, a fourth lens element 940, a fifth lens element 950, a sixth lens element 960, a filter 970 and an image surface 980, wherein the image sensor 990 is disposed on the image surface 980 of the imaging lens assembly. The imaging lens assembly includes six lens elements (910, 920, 930, 940, 950, 960) without additional one or more lens elements inserted between the first lens element 910 and the sixth lens element 960, and each of the first lens element 910, the second lens element 920, the third lens element 930, the fourth lens element 940, the fifth lens element 950 and the sixth lens element 960 is a single and non-cemented lens element.

The first lens element 910 with negative refractive power has an object-side surface 911 being convex in a paraxial region thereof and an image-side surface 912 being concave in a paraxial region thereof. The first lens element 910 is made of a glass material, and has the object-side surface 911 and the image-side surface 912 being both spherical.

The second lens element 920 with positive refractive power has an object-side surface 921 being convex in a paraxial region thereof and an image-side surface 922 being convex in a paraxial region thereof. The second lens element 920 is made of a plastic material, and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of a plastic material, and has the object-side surface 941 and the image-side surface 942 being both aspheric. Furthermore, each of the object-side surface 941 and the image-side surface 942 of the fourth lens element 940 includes at least one inflection point.

The fifth lens element 950 with positive refractive power has an object-side surface 951 being convex in a paraxial region thereof and an image-side surface 952 being convex in a paraxial region thereof. The fifth lens element 950 is made of a plastic material, and has the object-side surface

951 and the image-side surface 952 being both aspheric. Furthermore, the object-side surface 951 of the fifth lens element 950 includes a concave shape in an off-axis region thereof.

The sixth lens element 960 with positive refractive power has an object-side surface 961 being concave in a paraxial region thereof and an image-side surface 962 being convex in a paraxial region thereof. The sixth lens element 960 is made of a plastic material, and has the object-side surface 961 and the image-side surface 962 being both aspheric.

Furthermore, each of the object-side surface 961 and the image-side surface 962 of the sixth lens element 960 includes at least one inflection point.

The filter 970 is made of a glass material and located between the sixth lens element 960 and the image surface 980, and will not affect the focal length of the imaging lens assembly.

The detailed optical data of the 9th embodiment are shown in Table 17 and the aspheric surface data are shown in Table 18 below.

TABLE 17

9th Embodiment f = 1.59 mm, Fno = 1.70, HFOV = 58.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 31.506 | | 2.643 | Glass | 1.639 | 55.4 | −5.85 |
| 2 | | 3.231 | | 2.060 | | | | |
| 3 | Lens 2 | 31.468 | ASP | 3.300 | Plastic | 1.584 | 28.2 | 8.23 |
| 4 | | −5.457 | ASP | 0.702 | | | | |
| 5 | Ape. Stop | Plano | | 0.405 | | | | |
| 6 | Lens 3 | −19.608 | ASP | 0.572 | Plastic | 1.584 | 28.2 | −4.81 |
| 7 | | 3.318 | ASP | 0.300 | | | | |
| 8 | Lens 4 | 5.772 | ASP | 1.518 | Plastic | 1.544 | 55.9 | 5.52 |
| 9 | | −5.682 | ASP | 0.329 | | | | |
| 10 | Lens 5 | 3.618 | ASP | 2.297 | Plastic | 1.634 | 23.8 | 2.61 |
| 11 | | −2.297 | ASP | 0.455 | | | | |
| 12 | Lens 6 | −0.651 | ASP | 1.882 | Plastic | 1.584 | 28.2 | 2.08 |
| 13 | | −0.876 | ASP | 0.600 | | | | |
| 14 | Filter | Plano | | 0.300 | Glass | 1.517 | 64.2 | — |
| 15 | | Plano | | 1.145 | | | | |
| 16 | Image | Plano | | — | | | | |

Reference wavelength is 587.6 nm (d-line).

TABLE 18

Aspheric Coefficients

| | Surface # | | | | |
|---|---|---|---|---|---|
| | 3 | 4 | 6 | 7 | 8 |
| k = | 5.3776E+00 | −3.2360E−01 | −9.6329E+01 | 1.7434E−01 | −3.8641E+01 |
| A4 = | 3.0001E−03 | 3.6974E−04 | −5.8432E−02 | −7.9799E−02 | 1.8557E−02 |
| A6 = | −1.2856E−04 | −1.6721E−07 | 1.0912E−02 | 2.5449E−02 | −1.8747E−02 |
| A8 = | −3.3903E−06 | −6.3241E−06 | −9.3050E−04 | −3.8485E−03 | 8.6501E−03 |
| A10 = | | | −3.0555E−03 | −7.2829E−04 | −1.7698E−03 |
| A12 = | | | 6.4821E−04 | 1.2239E−04 | 1.3089E−04 |

| | Surface # | | | | |
|---|---|---|---|---|---|
| | 9 | 10 | 11 | 12 | 13 |
| k = | −7.8963E+01 | −9.4520E+00 | −4.3725E−01 | −2.4774E+00 | −2.4595E+00 |
| A4 = | −8.2020E−02 | −2.6301E−02 | 2.6929E−02 | 2.1329E−02 | 3.6191E−02 |
| A6 = | 3.0716E−02 | 7.9026E−03 | −8.2563E−03 | −6.5163E−03 | −2.8389E−03 |
| A8 = | −9.6803E−03 | −2.9462E−03 | 1.9703E−03 | 1.4998E−03 | −9.3924E−05 |
| A10 = | 1.7275E−03 | 4.8358E−04 | −2.4732E−04 | −2.0692E−04 | 7.6055E−06 |
| A12 = | −1.1300E−04 | −2.5977E−05 | 1.3695E−05 | 1.1444E−05 | 6.8506E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.59 | (R7 + R8)/(R7 − R8) | 0.01 |
| Fno | 1.70 | CT6/T56 | 4.14 |
| HFOV [deg.] | 58.4 | f/TL | 0.09 |
| 1/|tan(HFOV)| | 0.61 | f5/CT2 | 0.79 |
| V3 | 28.2 | f5/T12 | 1.27 |
| V2 + V3 + V6 | 84.6 | f5/CT2 + f5/T12 | 2.06 |
| N1 + N2 | 3.223 | fG2/fG1 | 0.07 |
| (R3 − R4)/(R3 + R4) | 1.42 | BL/CT2 | 0.62 |
| (R4 + R5)/(R4 − R5) | −1.77 | (|P3| + |P4| + |P6|)/|P5| | 2.27 |
| (R5 + R6)/(R5 − R6) | 0.71 | |DsR5/DsR6| | 0.41 |
| (R4 + R6)/(R4 − R6) | 0.24 | | |

10th Embodiment

Figure 20:
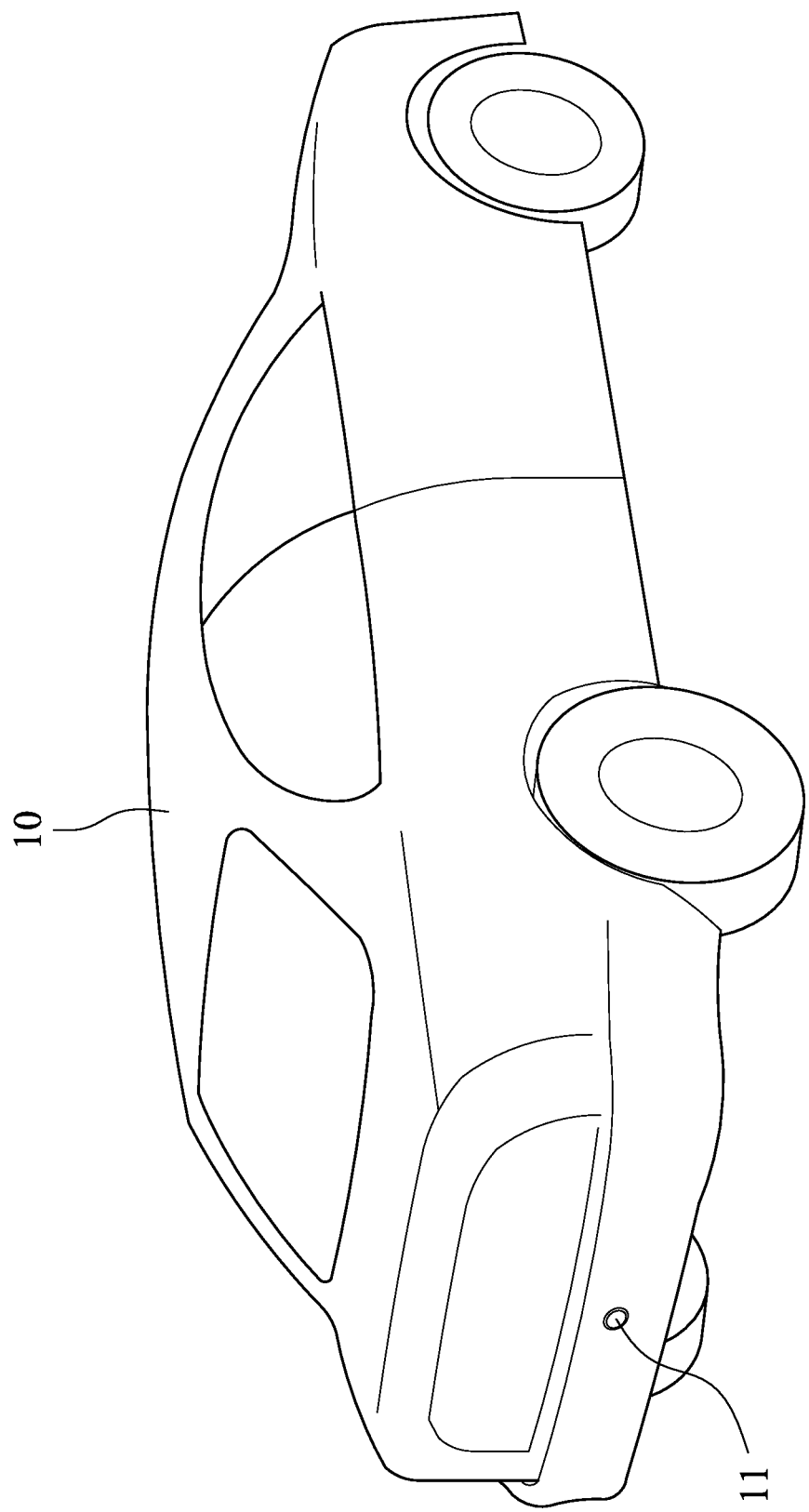
FIG. 20 is a schematic view of an electronic device according to the 10th embodiment of the present disclosure.

FIG. 20 is a schematic view of an electronic device 10 according to the 10th embodiment of the present disclosure. According to the 10th embodiment, the electronic device 10 is a rearview camera device, the electronic device 10 includes an imaging apparatus 11, the imaging apparatus 11 includes an imaging lens assembly according to the present disclosure (its reference numeral is omitted) and an image sensor (its reference numeral is omitted), wherein the image sensor is disposed on an image surface of the imaging lens assembly.

The aforementioned electronic device not only can be applied to the mobile system as a rearview camera device disposing on the rear side of a vehicle, but also can be used as other sensing devices, which can be disposed on the front side, two sides or other locations that can sense the environmental changes of the mobile system. The imaging apparatus can be designed with different viewing angles in accordance with distances, locations and ranges to be sensed, and the environmental changes can be calculated by the software. Therefore, automatic driving or driving assistance can be achieved, which can also be combined with remote communications, radar, high beam control, blind spot detection, pedestrian detection, intelligent brakes, traffic identification, GPS, etc., thereby enhancing driving safety and convenience of life. Moreover, in order to use the electronic device in a variety of environments (such as temperature changes and external force collisions, etc.), the imaging apparatus of the electronic device may provide characteristics of anti-high temperature, corrosion resistance and high strength structure.

11th Embodiment

Figure 21:
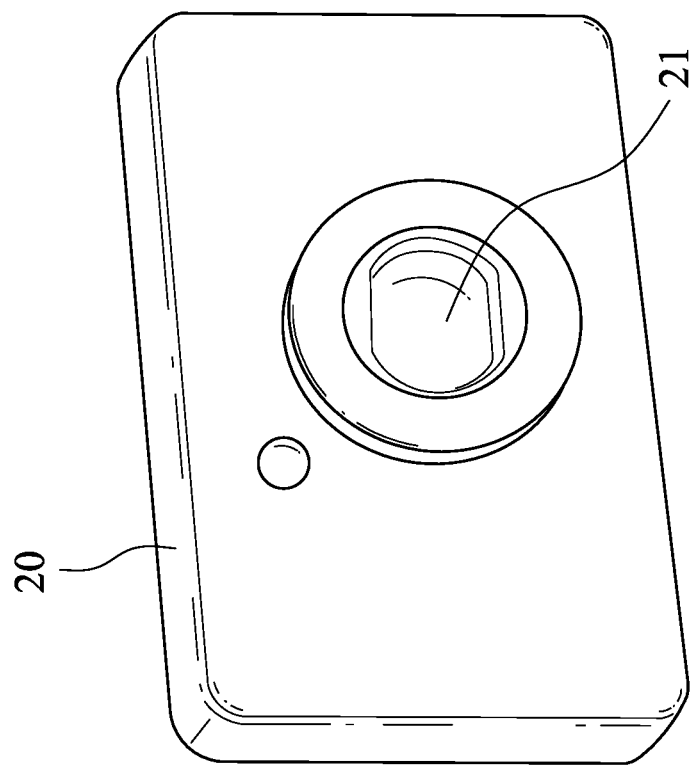
FIG. 21 is a schematic view of an electronic device according to the 11th embodiment of the present disclosure.

FIG. 21 is a schematic view of an electronic device 20 according to the 11th embodiment of the present disclosure. According to the 11th embodiment, the electronic device 20 is a driving recording system, the electronic device 20 includes an imaging apparatus 21, the imaging apparatus 21 includes an imaging lens assembly according to the present disclosure (its reference numeral is omitted) and an image sensor (its reference numeral is omitted), wherein the image sensor is disposed on an image surface of the imaging lens assembly.

12th Embodiment

Figure 22:
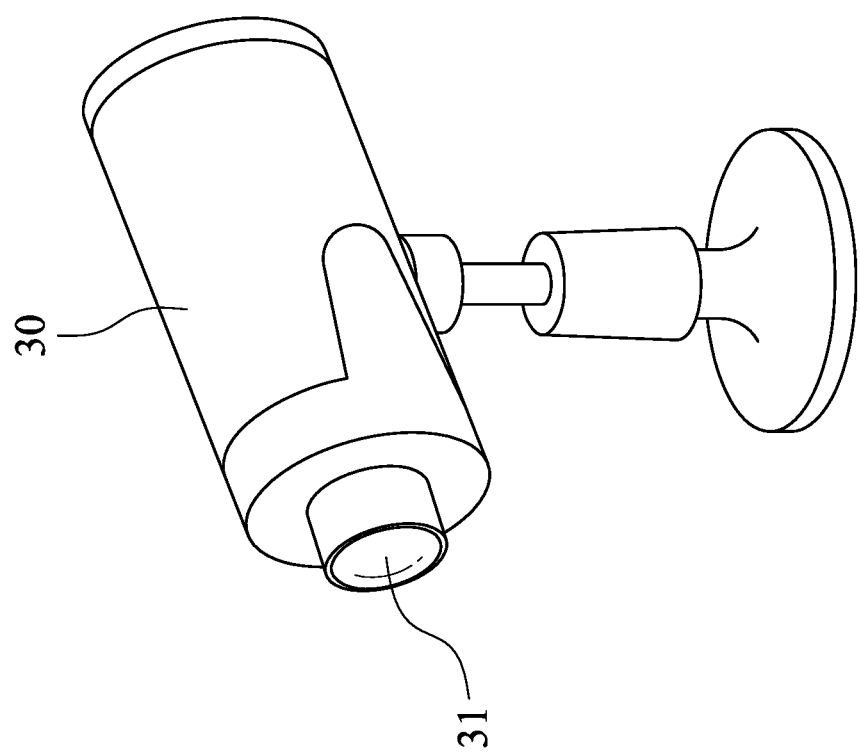
FIG. 22 is a schematic view of an electronic device according to the 12th embodiment of the present disclosure.

FIG. 22 is a schematic view of an electronic device 30 according to the 12th embodiment of the present disclosure. The electronic device 30 of the 12th embodiment is a surveillance device, wherein the electronic device 30 includes an imaging apparatus 31. The imaging apparatus 31 includes an imaging lens assembly (its reference numeral is omitted) according to the present disclosure and an image sensor (its reference numeral is omitted), wherein the image sensor is disposed on an image surface of the imaging lens assembly.

The foregoing description, for purpose of explanation, has been described with reference to specific embodiments. It is to be noted that Tables 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising six lens elements, the six lens elements being, in order from an object side to an image side:
    a first lens element having negative refractive power;
    a second lens element having positive refractive power;
    a third lens element having negative refractive power;
    a fourth lens element;
    a fifth lens element having positive refractive power; and
    a sixth lens element;
    wherein a focal length of the fifth lens element is f5, a central thickness of the second lens element is CT2, a curvature radius of an image-side surface of the second lens element is R4, a curvature radius of an object-side surface of the third lens element is R5, and the following conditions are satisfied:

$$0.10<f5/CT2<1.20; \text{ and}$$

$$(R4+R5)/(R4-R5)<0.75.$$

2. The imaging lens assembly of claim 1, wherein the image-side surface of the second lens element is convex in a paraxial region thereof, and at least one of an object-side surface and an image-side surface of the fourth lens element comprises at least one inflection point.

3. The imaging lens assembly of claim 1, wherein the sixth lens element has an image-side surface being convex in a paraxial region thereof, the curvature radius of the image-side surface of the second lens element is R4, a curvature radius of an image-side surface of the third lens element is R6, and the following condition is satisfied:

$$0.15<(R4+R6)/(R4-R6)<0.75.$$

4. The imaging lens assembly of claim 1, wherein the focal length of the fifth lens element is f5, the central thickness of the second lens element is CT2, and the following condition is satisfied:

$0.20<f5/CT2<0.90$.

5. The imaging lens assembly of claim 1, wherein at least three of the first lens element, the second lens element, the third lens element, the fourth lens element, the fifth lens element and the sixth lens element are made of plastic materials, the curvature radius of the image-side surface of the second lens element is R4, the curvature radius of the object-side surface of the third lens element is R5, and the following condition is satisfied:

$-3.0<(R4+R5)/(R4-R5)<0.50$.

6. The imaging lens assembly of claim 1, wherein the focal length of the fifth lens element is f5, the central thickness of the second lens element is CT2, an axial distance between the first lens element and the second lens element is T12, and the following condition is satisfied:

$0.30<f5/CT2+f5/T12<3.50$.

7. The imaging lens assembly of claim 1, wherein the fifth lens element has an object-side surface being convex in a paraxial region thereof and comprising at least one concave shape in an off-axis region thereof, a half of a maximum field of view of the imaging lens assembly is HFOV, and the following condition is satisfied:

$1/|\tan(HFOV)|<1.20$.

8. The imaging lens assembly of claim 1, further comprising:
an aperture stop, wherein a composite focal length of the lens elements disposed between an imaged object and the aperture stop is fG1, a composite focal length of the lens elements disposed between the aperture stop and an image surface is fG2, a focal length of the imaging lens assembly is f, an axial distance between an object-side surface of the first lens element and the image surface is TL, and the following conditions are satisfied:

$0<fG2/fG1<2.0$; and $0<f/TL<0.20$.

9. The imaging lens assembly of claim 1, further comprising:
an aperture stop disposed on an object side of the third lens element, wherein an f-number of the imaging lens assembly is Fno, and the following condition is satisfied:

$1.0<Fno<3.0$.

10. The imaging lens assembly of claim 1, wherein an Abbe number of the third lens element is V3, and the following condition is satisfied:

$10.0<V3<30.0$.

11. An imaging lens assembly comprising six lens elements, the six lens elements being, in order from an object side to an image side:
a first lens element having negative refractive power;
a second lens element having positive refractive power;
a third lens element;
a fourth lens element;
a fifth lens element having positive refractive power; and
a sixth lens element having an image-side surface being convex in a paraxial region thereof;

wherein a central thickness of the second lens element is larger than a axial distance between the first lens element and the second lens element, a focal length of the fifth lens element is f5, the central thickness of the second lens element is CT2, a curvature radius of an object-side surface of the third lens element is R5, a curvature radius of an image-side surface of the third lens element is R6, a curvature radius of an object-side surface of the fourth lens element is R7, a curvature radius of an image-side surface of the fourth lens element is R8, and the following conditions are satisfied:

$0.10<f5/CT2<1.40$;

$0.45<(R5+R6)/(R5-R6)$; and $(R7+R8)/(R7-R8)<1.50$.

12. The imaging lens assembly of claim 11, wherein at least one of an object-side surface and the image-side surface of the sixth lens element comprises at least one inflection point.

13. The imaging lens assembly of claim 11, wherein the image-side surface of the third lens element is concave in a paraxial region thereof, and the sixth lens element has an object-side surface being concave in a paraxial region thereof.

14. The imaging lens assembly of claim 11, wherein the third lens element has negative refractive power, a curvature radius of an object-side surface of the second lens element is R3, a curvature radius of an image-side surface of the second lens element is R4, and the following condition is satisfied:

$0<(R3-R4)/(R3+R4)<2.20$.

15. The imaging lens assembly of claim 11, wherein the curvature radius of the object-side surface of the third lens element is R5, the curvature radius of the image-side surface of the third lens element is R6, the curvature radius of the object-side surface of the fourth lens element is R7, the curvature radius of the image-side surface of the fourth lens element is R8, and the following conditions are satisfied:

$1.0<(R5+R6)/(R5-R6)<4.50$; and $-5.0<(R7+R8)/(R7-R8)<0.75$.

16. The imaging lens assembly of claim 11, wherein the focal length of the fifth lens element is f5, an axial distance between the first lens element and the second lens element is T12, and the following condition is satisfied:

$0.30<f5/T12<2.50$.

17. The imaging lens assembly of claim 11, wherein an axial distance between the image-side surface of the sixth lens element and an image surface is BL, the central thickness of the second lens element is CT2, and the following condition is satisfied:

$0<BL/CT2<0.75$.

18. The imaging lens assembly of claim 11, wherein a refractive power of the third lens element is P3, a refractive power of the fourth lens element is P4, a refractive power of the fifth lens element is P5, a refractive power of the sixth lens element is P6, a focal length of the imaging lens assembly is f, an axial distance between an object-side surface of the first lens element and an image surface is TL, and the following conditions are satisfied:

(|P3|+|P4|+|P6|)/|P5|<2.50; and

0<f/TL<0.20.

19. The imaging lens assembly of claim 11, wherein a half of a maximum field of view of the imaging lens assembly is HFOV, an f-number of the imaging lens assembly is Fno, and the following conditions are satisfied:

1/|tan(HFOV)|<0.85; and 1.0<Fno<2.40.

20. The imaging lens assembly of claim 11, wherein an Abbe number of the second lens element is V2, an Abbe number of the third lens element is V3, an Abbe number of the sixth lens element is V6, and the following condition is satisfied:

30.0<V2+V3+V6<90.0.

21. The imaging lens assembly of claim 11, wherein a refractive index of the first lens element is N1, a refractive index of the second lens element is N2, and the following condition is satisfied:

3.45<N1+N2<4.50.

22. The imaging lens assembly of claim 11, further comprising:
an aperture stop, wherein an axial distance between the aperture stop and the object-side surface of the third lens element is DsR5, an axial distance between the aperture stop and the image-side surface of the third lens element is DsR6, a composite focal length of the lens elements disposed between an imaged object and the aperture stop is fG1, a composite focal length of the lens elements disposed between the aperture stop and an image surface is fG2, and the following conditions are satisfied:

0.10<|DsR5/DsR6|<0.85; and

0<fG2/fG1<1.0.

23. An imaging apparatus, comprising:
the imaging lens assembly of claim 11; and
an image sensor, wherein the image sensor is disposed on an image surface of the imaging lens assembly.

24. An electronic device, comprising:
the imaging apparatus of claim 23.

25. An imaging lens assembly comprising six lens elements, the six lens elements being, in order from an object side to an image side:
a first lens element having negative refractive power;
a second lens element having positive refractive power;
a third lens element having negative refractive power;
a fourth lens element;
a fifth lens element having positive refractive power; and
a sixth lens element;
wherein a curvature radius of an object-side surface of the third lens element is R5, a curvature radius of an image-side surface of the third lens element is R6, a focal length of the fifth lens element is f5, a central thickness of the second lens element is CT2, an axial distance between the first lens element and the second lens element is T12, a composite focal length of the lens elements disposed between an imaged object and the aperture stop is fG1, a composite focal length of the lens elements between the aperture stop and an image surface is fG2, and the following conditions are satisfied:

−3.50<(R5+R6)/(R5−R6);

0.50<f5/CT21−f5/T2<2.50; and

0<fG2/fG2<1.0.

26. The imaging lens assembly of claim 25, wherein the fourth lens element with positive refractive power has an object-side surface being convex in a paraxial region thereof and an image-side surface being concave in a paraxial region thereof.

27. The imaging lens assembly of claim 25, wherein the curvature radius of the object-side surface of the third lens element is R5, the curvature radius of the image-side surface of the third lens element is R6, a central thickness of the sixth lens element is CT6, an axial distance between the fifth lens element and the sixth lens element is T56, and the following conditions are satisfied:

−0.30<(R5+R6)/(R5−R6); and 0.50<CT6/T56<25.0.

28. The imaging lens assembly of claim 25, wherein a curvature radius of an image-side surface of the second lens element is R4, the curvature radius of the image-side surface of the third lens element is R6, and the following condition is satisfied:

−0.30<(R4+R6)/(R4−R6)<0.75.

29. The imaging lens assembly of claim 25, wherein at least one surface of at least one of the first lens element, the second lens element, the third lens element, the fourth lens element, the fifth lens element and the sixth lens element comprises at least one inflection point, a half of a maximum field of view of the imaging lens assembly is HFOV, and the following condition is satisfied:

1/|tan(HFOV)|<0.70.

30. The imaging lens assembly of claim 25, wherein there is an air space in a paraxial region between every adjacent lens elements of the first lens element, the second lens element, the third lens element, the fourth lens element, the fifth lens element and the sixth lens element;
wherein the imaging lens assembly further comprises an aperture stop, wherein an axial distance between the aperture stop and the object-side surface of the third lens element is DsR5, an axial distance between the aperture stop and the image-side surface of the third lens element is DsR6, and the following condition is satisfied:

0.10<|DsR5/DsR6|<0.75.

31. The imaging lens assembly of claim 25, wherein an Abbe number of the second lens element is V2, an Abbe number of the third lens element is V3, an Abbe number of the sixth lens element is V6, and the following condition is satisfied:

30.0<V2+V3+V6<105.0.

* * * * *

UNITED STATES PATENT AND TRADEMARK OFFICE
CERTIFICATE OF CORRECTION

PATENT NO. : 10,670,833 B2
APPLICATION NO. : 15/857924
DATED : June 2, 2020
INVENTOR(S) : Chien-Hsun Wu and Shu-Yun Yang It is certified that error appears in the above-identified patent and that said Letters Patent is hereby corrected as shown below:

In the Claims (1) In Column 44, Line 8 (in Claim 25), please delete the expression "$0.50<f5/CT21-f5/T2<2.50$", and insert therefor --$0.50 < f5/CT2+f5/T12 < 2.50$--.
(2) In Column 44, Line 10 (in Claim 25), please delete the expression "$0<fG2/fG2 <1.0$", and insert therefor --$0 < fG2/fG1 < 1.0$--.

Signed and Sealed this
Twenty-second Day of September, 2020

Andrei Iancu
*Director of the United States Patent and Trademark Office*